(12) United States Patent
Takahashi

(10) Patent No.: US 11,442,336 B2
(45) Date of Patent: Sep. 13, 2022

(54) IMAGING APPARATUS, FINDER DISPLAY CONTROL METHOD OF IMAGING APPARATUS, FINDER DISPLAY CONTROL PROGRAM OF IMAGING APPARATUS, AND VIEWFINDER

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 344 days.

(21) Appl. No.: 16/861,843

(22) Filed: Apr. 29, 2020

(65) Prior Publication Data

US 2020/0257182 A1  Aug. 13, 2020

Related U.S. Application Data

(63) Continuation of application No. PCT/JP2018/039709, filed on Oct. 25, 2018.

(30) Foreign Application Priority Data

Oct. 31, 2017 (JP) .............................. JP2017-210219

(51) Int. Cl.
*G02F 1/1333* (2006.01)
*G02F 1/1335* (2006.01)
(Continued)

(52) U.S. Cl.
CPC .......... *G03B 11/00* (2013.01); *G02B 27/0101* (2013.01); *G02F 1/13318* (2013.01);
(Continued)

(58) Field of Classification Search
CPC ............. G02F 1/1335; G02F 1/133521; G02F 1/133553; G02F 1/133555;
(Continued)

(56) References Cited

U.S. PATENT DOCUMENTS

2014/0002709 A1  1/2014 Sakurabu
2014/0247386 A1  9/2014 Takagi

FOREIGN PATENT DOCUMENTS

JP     2003-78785 A    3/2003
JP     2007-336169 A   12/2007
(Continued)

OTHER PUBLICATIONS

International Preliminary Report on Patentability and Written Opinion of the International Searching Authority, dated May 14, 2020, for International Application No. PCT/JP2018/039709, with an English Translation.
(Continued)

*Primary Examiner* — Thoi V Duong
(74) *Attorney, Agent, or Firm* — Birch, Stewart, Kolasch & Birch, LLP

(57) ABSTRACT

Provided are an imaging apparatus capable of maintaining favorable visibility of display in a finder, a finder display control method of the imaging apparatus, a finder display control program of the imaging apparatus, and a viewfinder. The viewfinder (30) includes an observation optical system (32), a finder LCD (36), a beam splitter (34) that superimposes display of the finder LCD (36) on an optical image of a subject observed through the observation optical system (32), an electronic variable ND filter (40) that adjusts a light amount of the optical image of the subject incident into the beam splitter (34), a transmittance measurement unit (90) that measures the transmittance of the electronic variable ND filter (40) changing over time in a case where the transmittance of the electronic variable ND filter (40) is switched, and a finder LCD display control unit (110*b*) that controls the light amount of the display device in real time on the basis of the result of measurement of the transmittance measurement unit (90). The finder LCD display control unit (110*b*) controls the light amount of the finder LCD
(Continued)

(36) so as to keep constant a light amount ratio of the optical image of the subject observed through the observation optical system (32) and the display of the finder LCD (36) superimposed on the optical image.

12 Claims, 18 Drawing Sheets

(51) Int. Cl.
*G03B 11/00* (2021.01)
*G02B 27/01* (2006.01)
*G02F 1/133* (2006.01)
*G02F 1/163* (2006.01)
*G03B 13/06* (2021.01)
*H04N 5/232* (2006.01)

(52) U.S. Cl.
CPC ............. *G02F 1/163* (2013.01); *G03B 13/06* (2013.01); *H04N 5/23293* (2013.01); *G02F 2203/58* (2013.01)

(58) Field of Classification Search
CPC ........... G02F 1/133557; G02F 1/13318; G02F 1/163; G02F 2203/58; G03B 11/00; G03B 13/06; G03B 17/20; G02B 27/0101; H04N 5/23293; H04N 5/225; H04N 5/23245
See application file for complete search history.

(56) References Cited

FOREIGN PATENT DOCUMENTS

| | | |
|---|---|---|
| JP | 2013-88597 A | 5/2013 |
| JP | 2014-48491 A | 3/2014 |
| JP | 2014-48492 A | 3/2014 |
| WO | WO 2012/120952 A1 | 9/2012 |

OTHER PUBLICATIONS

International Search Report, dated Jan. 22, 2019, for International Application No. PCT/JP2018/39709, with an English translation.

IMAGING APPARATUS, FINDER DISPLAY CONTROL METHOD OF IMAGING APPARATUS, FINDER DISPLAY CONTROL PROGRAM OF IMAGING APPARATUS, AND VIEWFINDER

CROSS-REFERENCE TO RELATED APPLICATIONS

The present application is a Continuation of PCT International Application No. PCT/JP2018/039709 filed on Oct. 25, 2018 claiming priority under 35 U.S.C § 119(a) to Japanese Patent Application No. 2017-210219 filed on Oct. 31, 2017. Each of the above applications is hereby expressly incorporated by reference, in its entirety, into the present application.

BACKGROUND OF THE INVENTION

1. Field of the Invention

The present invention relates to an imaging apparatus, a finder display control method of the imaging apparatus, a finder display control program of the imaging apparatus, and a viewfinder. Particularly, the present invention relates to an imaging apparatus having a function of showing various types of information on a screen of an optical finder, a finder display control method of the imaging apparatus, a finder display control program of the imaging apparatus, and a viewfinder.

2. Description of the Related Art

An imaging apparatus having a function of showing various types of information on a screen of an optical finder is known. This function is realized by overlapping the display of the display device with a half mirror.

However, in the case of a configuration in which the display of the display device is viewed again with the half mirror, there is a problem that in a case where the surrounding environment is bright, the display of the display device blends into the background, thereby making it difficult to visually recognize the display.

In order to solve this problem, JP2014-048491A and JP2003-078785A each proposes a configuration where an electronic variable ND filter (ND: Neutral Density) is disposed in an optical finder and transmittance of the electronic variable ND filter is changed in accordance with the brightness of external light.

SUMMARY OF THE INVENTION

However, the electronic variable ND filter has a disadvantage in that the operating speed is slow and it takes time to switch to the target transmittance. Therefore, in a case where the transmittance of the electronic variable ND filter is switched in use of the finder, there is a disadvantage in that the visibility of the optical finder is reduced for a certain period of time.

The present invention has been made in view of such circumstances, and its object is to provide an imaging apparatus capable of maintaining favorable visibility of display in a finder, a finder display control method of the imaging apparatus, a finder display control program of the imaging apparatus, and a viewfinder.

The means for solving the above problems are as follows.

(1) An imaging apparatus comprising: an optical finder through which an optical image of a subject is observed; a display device (display); a superimposing optical element that is disposed in an optical path of the optical finder so as to superimpose display of the display device on the optical image of the subject observed through the optical finder; an electronic variable ND filter that is disposed in an optical path of the optical finder so as to adjust a light amount of the optical image of the subject incident into the superimposing optical element; a transmittance measurement unit (transmittance measurer) that measures a transmittance of the electronic variable ND filter changing over time in a case where the transmittance of the electronic variable ND filter is switched; and a display device light amount control unit (processor) that controls a light amount of the display device on the basis of a result of measurement of the transmittance measurement unit so as to keep constant a light amount ratio of the optical image of the subject observed through the optical finder and the display of the display device superimposed on the optical image.

According to this aspect, the electronic variable ND filter is provided in the optical path of the optical finder. The electronic variable ND filter is a neutral density filter (ND filter) that is able to electronically control the transmittance (density). The electronic variable ND filter has a characteristic that the operating speed is slow. In this aspect, in a case where the transmittance of the electronic variable ND filter is switched, the transmittance of the electronic variable ND filter changing over time is measured by the transmittance measurement unit. Then, the light amount of the display device is controlled on the basis of the result of measurement. Specifically, the light amount of the display device is controlled such that the light amount ratio of the optical image of the subject observed through the optical finder and the display of the display device superimposed on the optical image is kept constant. As a result, even in a case where the transmittance of the electronic variable ND filter is switched, the visibility of the display in the finder can be favorably maintained. It should be noted that the term "constant" here includes a range in which the light amount ratio is considered to be substantially constant. That is, the term includes the case where the light amount ratio is kept substantially constant. The range in which the light amount ratio is considered to be substantially constant is a range in which the visibility is considered to be favorable.

(2) The imaging apparatus according to (1), where the transmittance measurement unit includes a temperature measurement unit that measures temperature and a time measurement unit (clock) that measures an elapsed time since the transmittance of the electronic variable ND filter is switched, and specifies the transmittance of the electronic variable ND filter, on the basis of information about the temperature measured by the temperature measurement unit (temperature sensor) and information about the elapsed time measured by the time measurement unit.

According to this aspect, the transmittance of the electronic variable ND filter is specified on the basis of the temperature and the elapsed time from the start of the switching of the transmittance. That is, the operating characteristics of the electronic variable ND filter are checked in advance, and the transmittance is estimated on the basis of the operating characteristics. The temperature information is used since the operating speed of the electronic variable ND filter changes with temperature. The specification of the transmittance is performed using, for example, a table or a function.

(3) The imaging apparatus according to (1), where the transmittance measurement unit includes a light emitting unit (light emitter) and a light receiving unit (light receptor) that are disposed to face each other with the electronic variable ND filter interposed therebetween, and measures the transmittance of the electronic variable ND filter by receiving light, which is emitted from the light emitting unit, through the light receiving unit.

According to this aspect, the transmittance measurement unit is configured to include the light emitting unit and the light receiving unit. The light emitting unit and the light receiving unit are disposed to face each other with the electronic variable ND filter interposed therebetween. The transmittance measurement unit measures the transmittance of the electronic variable ND filter by receiving the light, which is emitted from the light emitting unit, through the light receiving unit. Thereby, the transmittance of the electronic variable ND filter can be measured.

(4) The imaging apparatus according to (1), where the transmittance measurement unit includes a reflective member (reflector), and a light emitting unit (light emitter) and a light receiving unit (light receptor) that are disposed to face the reflective member with the electronic variable ND filter interposed therebetween, and measures the transmittance of the electronic variable ND filter by receiving light, which is emitted from the light emitting unit and reflected by the reflective member, through the light receiving unit.

According to this aspect, the transmittance measurement unit is configured to include the reflective member, the light emitting unit, and the light receiving unit. The light emitting unit and the light receiving unit are disposed to face the reflective member with the electronic variable ND filter interposed therebetween. The light emitted from the light emitting unit is transmitted through the electronic variable ND filter and is reflected by the reflective member. The light reflected by the reflective member is transmitted through the electronic variable ND filter again and is received by the light receiving unit. The transmittance measurement unit measures the transmittance of the electronic variable ND filter on the basis of the result of light reception of the light receiving unit. Thereby, the transmittance of the electronic variable ND filter can be measured. Further, the configuration of the transmittance measurement unit can be made compact.

(5) The imaging apparatus according to (4), where the reflective member is provided on the electronic variable ND filter in a holding unit (holder).

According to this aspect, the reflective member is provided on the holding unit of the electronic variable ND filter. Thereby, the configuration of the transmittance measurement unit can be simplified.

(6) The imaging apparatus according to any one of (1) to (5), where the optical finder is composed of an optical system, which is independent of an imaging lens, to observe an optical image of a subject incident through a finder window unit (finder window) from an eyepiece unit (eyepiece).

According to this aspect, the optical finder is composed of an optical system independent of the imaging lens. That is, the optical finder is composed of not a reflex finder (a finder in which light passing through an imaging lens is reflected by a mirror and an image is formed on a focusing screen and through which an image on the focusing screen is observed) but a viewfinder through which a virtual image or a see-through real image is observed. The viewfinder is sensitive to external light. Therefore, the present invention works particularly effectively in a case where the present invention is applied to the viewfinder.

(7) The imaging apparatus according to (6), where the electronic variable ND filter is provided in the finder window unit.

According to this aspect, the electronic variable ND filter is provided in the finder window unit of the viewfinder. Thereby, it is possible to appropriately adjust the light amount of light incident into the optical finder.

(8) The imaging apparatus according to any one of (1) to (7), where the electronic variable ND filter is composed of an electrochromic element.

According to this aspect, the electronic variable ND filter is composed of the electrochromic element. A variable ND filter composed of an electrochromic element has a characteristic that the operating speed is particularly slow. Therefore, the present invention works particularly effectively.

(9) The imaging apparatus according to any one of (1) to (8), further comprising: a photometry unit (illuminance sensor) that measures external light; and a transmittance switching control unit (processor) that switches the transmittance of the electronic variable ND filter on the basis of a result of photometry of the photometry unit.

According to this aspect, the transmittance of the electronic variable ND filter is switched on the basis of the result of photometry of the external light. Thereby, the transmittance of the electronic variable ND filter can be set as an appropriate transmittance in accordance with the external light.

(10) A finder display control method of an imaging apparatus including an optical finder through which an optical image of a subject is observed, a display device (display), a superimposing optical element that is disposed in an optical path of the optical finder so as to superimpose display of the display device on the optical image of the subject observed through the optical finder, and an electronic variable ND filter that is disposed in an optical path of the optical finder so as to adjust a light amount of the optical image of the subject incident into the superimposing optical element, the method comprising: a step of measuring a transmittance of the electronic variable ND filter changing over time in a case where the transmittance of the electronic variable ND filter is switched; and a step of controlling the light amount of the display device on the basis of a result of measurement of the transmittance so as to keep constant a light amount ratio of the optical image of the subject observed through the optical finder and the display of the display device superimposed on the optical image.

According to this aspect, in a case where the transmittance of the electronic variable ND filter is switched, the transmittance of the electronic variable ND filter is measured in real time. Then, the light amount of the display device is controlled on the basis of the result of measurement. Specifically, the light amount of the display device is controlled such that the light amount ratio of the optical image of the subject observed through the optical finder and the display of the display device superimposed on the optical image is kept constant. As a result, even in a case where the transmittance of the electronic variable ND filter is switched, the visibility of the display in the finder can be favorably maintained.

(11) A finder display control program of an imaging apparatus including an optical finder through which an optical image of a subject is observed, a display device (display), a superimposing optical element that is disposed in an optical path of the optical finder so as to superimpose display of the display device on the optical image of the subject observed through the optical finder, and an electronic variable ND filter that is disposed in an optical path of the optical finder so as to adjust a light amount of the optical image of the subject incident into the superimposing optical element, the program for causing a computer to execute: a function of acquiring information about a result of measurement of a transmittance of the electronic variable ND filter changing over time in a case where the transmittance of the electronic variable ND filter is switched; and a function of controlling the light amount of the display device on the basis of a result of measurement of the transmittance so as to keep constant a light amount ratio of the optical image of the subject observed through the optical finder and the display of the display device superimposed on the optical image.

According to this aspect, in a case where the transmittance of the electronic variable ND filter is switched, the transmittance of the electronic variable ND filter is measured in real time. Then, the light amount of the display device is controlled on the basis of the result of measurement. Specifically, the light amount of the display device is controlled such that the light amount ratio of the optical image of the subject observed through the optical finder and the display of the display device superimposed on the optical image is kept constant. As a result, even in a case where the transmittance of the electronic variable ND filter is switched, the visibility of the display in the finder can be favorably maintained.

(12) A viewfinder comprising: an observation optical system through which an optical image of a subject incident through the finder window unit from the eyepiece unit is observed; a display device (display); a superimposing optical element that is disposed in an optical path of the observation optical system so as to superimpose display of the display device on the optical image of the subject observed through the observation optical system; an electronic variable ND filter that is disposed in an optical path of the observation optical system so as to adjust a light amount of the optical image of the subject incident into the superimposing optical element; a transmittance measurement unit (transmittance measurer) that measures a transmittance of the electronic variable ND filter changing over time in a case where the transmittance of the electronic variable ND filter is switched; and a display device light amount control unit (processor) that controls a light amount of the display device on the basis of a result of measurement of the transmittance measurement unit so as to keep constant a light amount ratio of the optical image of the subject observed through the observation optical system and the display of the display device superimposed on the optical image.

According to this aspect, in a case where the transmittance of the electronic variable ND filter is switched, the transmittance of the electronic variable ND filter is measured in real time. Then, the light amount of the display device is controlled on the basis of the result of measurement. Specifically, the light amount of the display device is controlled such that the light amount ratio of the optical image of the subject observed through the observation optical system and the display of the display device superimposed on the optical image is kept constant. As a result, even in a case where the transmittance of the electronic variable ND filter is switched, the visibility of the display in the finder can be favorably maintained.

According to this invention, the visibility of the display in a finder can be maintained favorably.

DESCRIPTION OF THE PREFERRED EMBODIMENTS

Hereinafter, preferred embodiments for carrying out the present invention will be described in detail with reference to the accompanying drawings.

[Appearance Configuration]

Figure 1:
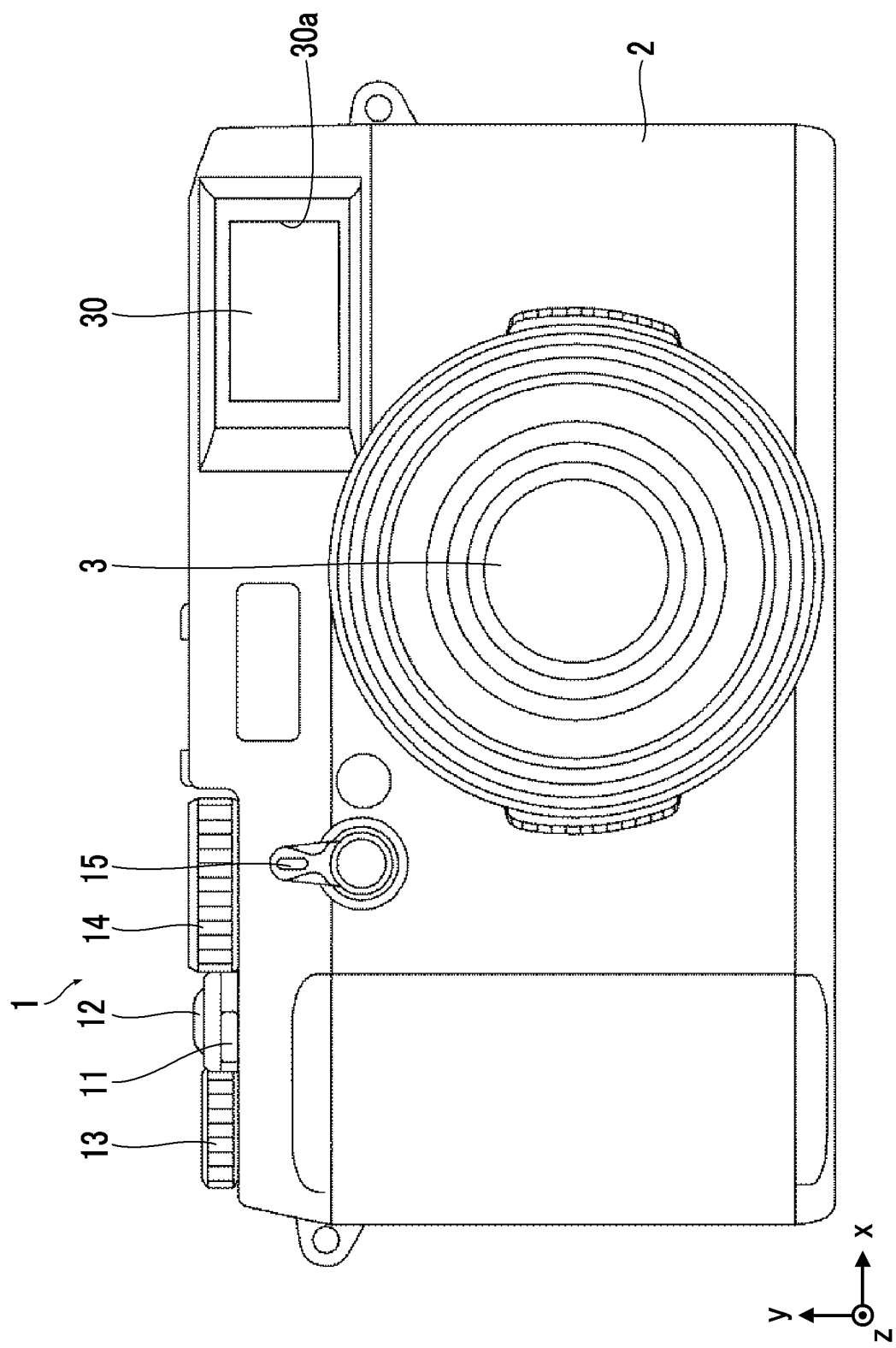
FIG. 1 is a front view showing an embodiment of a digital camera according to the present invention.
Figure 2:
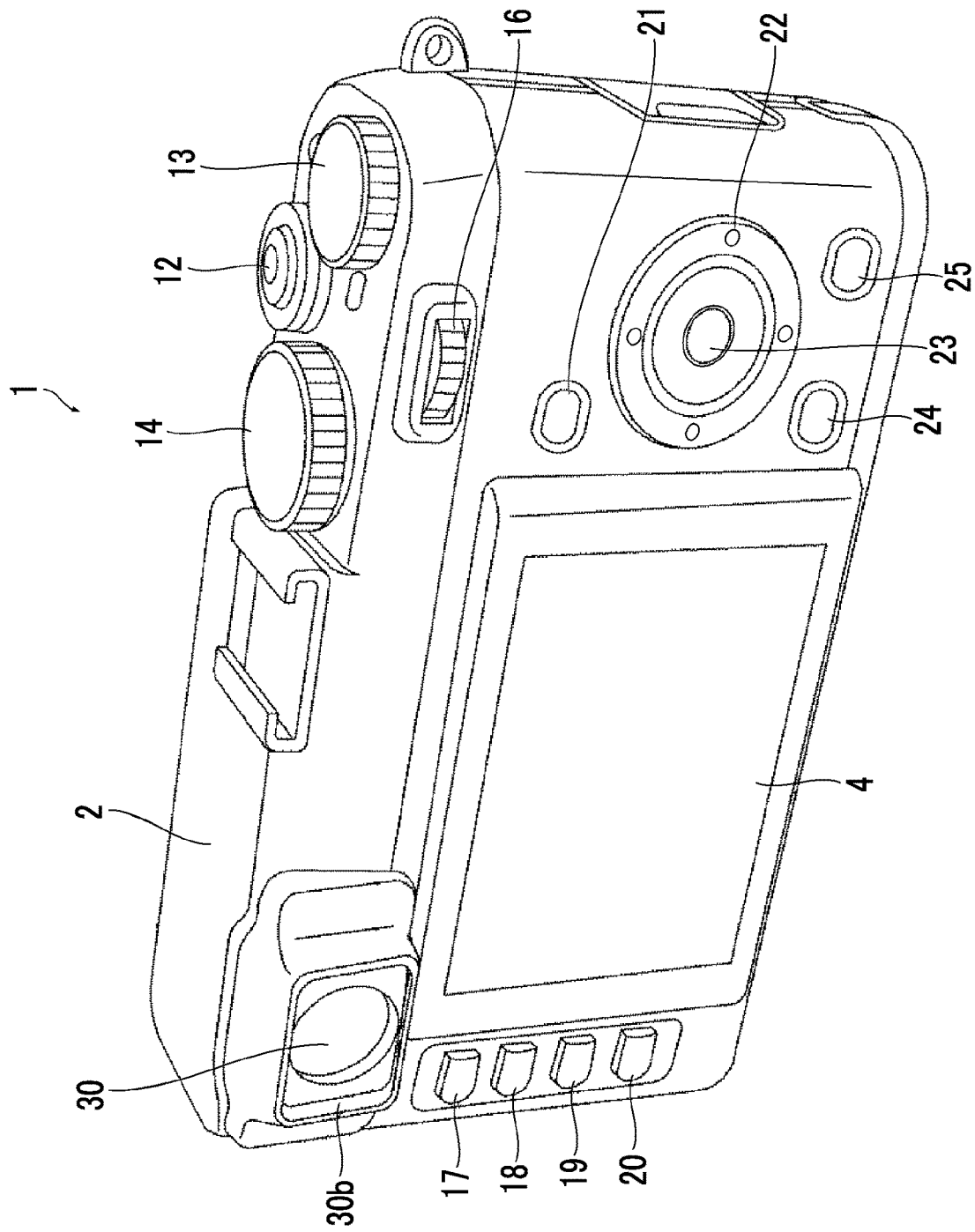
FIG. 2 is a rear perspective view of the digital camera shown in FIG. 1.

FIG. 1 is a front view showing an embodiment of a digital camera according to the present invention. FIG. 2 is a rear perspective view of the digital camera shown in FIG. 1.

The digital camera 1 is a lens-integrated digital camera in which an imaging lens 3 is integrally attached to a camera body 2. The digital camera 1 is an example of an imaging apparatus.

As shown in FIGS. 1 and 2, the digital camera 1 comprises an imaging lens 3, a viewfinder 30, a rear monitor 4, and the like on a camera body 2. Further, in the camera body 2, the digital camera 1 comprises, as operation members, a power lever 11, a shutter button 12, an exposure compensation dial 13, a shutter speed dial 14, a finder switching lever 15, a command dial 16, a view mode button 17, a reproduction button 18, an erase button 19, a function button 20, an AE/AF lock button 21, a selector button 22, an OK button 23, a menu button 24, a DISP/BACK button 25, and the like.

The imaging lens 3 is provided on the front surface of the camera body 2. The imaging lens 3 is composed of a single focus lens having a focus adjustment function.

The viewfinder 30 is composed of a hybrid viewfinder (HVF) that can be used by switching between both an optical viewfinder (OVF) and an electronic viewfinder (EVF). A finder window unit 30a of the viewfinder 30 is provided on the front surface of the camera body 2, and a finder eyepiece unit 30b of the viewfinder 30 is provided on the rear surface. Details of the viewfinder 30 will be described later.

The rear monitor 4 is provided on the rear surface of the camera body 2. The rear monitor 4 is composed of, for example, a liquid crystal display (LCD).

The power lever 11 is a lever for turning on and off the power of the digital camera 1. The power lever 11 is provided on the upper surface of the camera body 2. The power lever 11 swings around the shutter button 12 to selectively move between an on position and an off position. In a case where the power lever 11 is set to the ON position, the power of the digital camera 1 is turned on. In a case where the power lever 11 is moved to the off position, the power of the digital camera 1 is turned off.

The shutter button 12 is a button for issuing an instruction of imaging. The shutter button 12 is provided on the upper surface of the camera body 2. The shutter button 12 is composed of a two-stroke type push button that can be pressed halfway and pressed fully. In a case where the shutter button 12 is pressed halfway, an instruction of preparation for imaging is issued. Further, in a case where the shutter button 12 is pressed fully, an instruction of execution of imaging is issued.

The exposure compensation dial 13 is a dial for setting an exposure compensation amount. The exposure compensation dial 13 is provided on the upper surface of the camera body 2.

The shutter speed dial 14 is a dial for setting a shutter speed. The shutter speed dial 14 is provided on the upper surface of the camera body 2.

The finder switching lever 15 is a lever that switches the mode of the viewfinder 30. The finder switching lever 15 is provided on the front surface of the camera body 2. The finder switching lever 15 is swung to switch the mode of the viewfinder 30. Specifically, each time the finder switching lever 15 is swung, the viewfinder 30 alternately switches between OVF and EVF.

The command dial 16 is a rotary operation member that can be rotated clockwise and counterclockwise, and is provided on the rear surface of the camera body 2. A function corresponding to the mode of the digital camera 1 is assigned to the command dial 16. For example, in the imaging mode, the stop is adjusted, and in the reproduction mode, the image being reproduced is enlarged or reduced.

The view mode button 17 is a button for switching between display performed by the viewfinder 30 and display performed by the rear monitor 4. The view mode button 17 is provided on the rear surface of the camera body 2. Each time the view mode button 17 is pressed, the display on the viewfinder 30 and the display on the rear monitor 4 are alternately switched. In a case where the display performed by the viewfinder 30 is selected, the display performed by the rear monitor 4 is turned off. On the other hand, in a case where the display on the rear monitor 4 is selected, the display on the viewfinder 30 is turned off.

The reproduction button 18 is a button for issuing an instruction of switching from the imaging mode to the reproduction mode. The reproduction button 18 is provided on the rear surface of the camera body 2. In a case where the reproduction button 18 is pressed while the camera is set to the imaging mode, the mode of the digital camera 1 is switched to the reproduction mode. It should be noted that in a case where the shutter button 12 is pressed in the reproduction mode, the mode of the digital camera 1 is switched to the imaging mode.

The erase button 19 is a button for issuing an instruction of deletion of an image being reproduced. The erase button 19 is provided on the rear surface of the camera body 2.

The function button 20 is a button for operating a function assigned in advance. The function button 20 is provided on the rear surface of the camera body 2.

The AE/AF lock button 21 is a button for issuing an instruction of lock of automatic exposure (AE) and auto focus (AF). The AE/AF lock button 21 is provided on the rear surface of the camera body 2. While the AE/AF lock button 21 is pressed, the AE and AF are locked.

The selector button 22 is a button that can be pressed in four directions: up, down, left, and right directions. The selector button 22 is provided on the rear surface of the camera body 2. A function corresponding to the state of the digital camera 1 is assigned to each direction of the selector button 22. For example, in a case of performing various settings using the rear monitor 4, a function of moving a cursor displayed on the screen is assigned. In the reproduction mode, the functions of frame advance and frame return are assigned to the left and right buttons.

The OK button 23 is a button for issuing an instruction of OK in a case of performing various settings and the like. The OK button 23 is disposed at the center of the selector button 22.

The menu button 24 is a button for issuing an instruction of the loading of the menu screen. The menu button 24 is provided on the rear surface of the camera body 2. In a case where the menu button 24 is pressed, a menu screen for performing various settings is displayed on the rear monitor 4.

The DISP/BACK button 25 is a button (a function as a DISP button) for issuing an instruction of switching of the contents displayed on the rear monitor 4 and the viewfinder 30. The DISP/BACK button 25 is a button (function as a BACK button) for instructing the digital camera 1 to return to the previous state in a case of performing various settings and the like. The DISP/BACK button 25 is provided on the rear surface of the camera body 2. The function as the DISP button and the function as the BACK button are automatically switched in accordance with the state of the digital camera 1.

[Viewfinder]

<<Viewfinder Configuration>>

Figure 3:
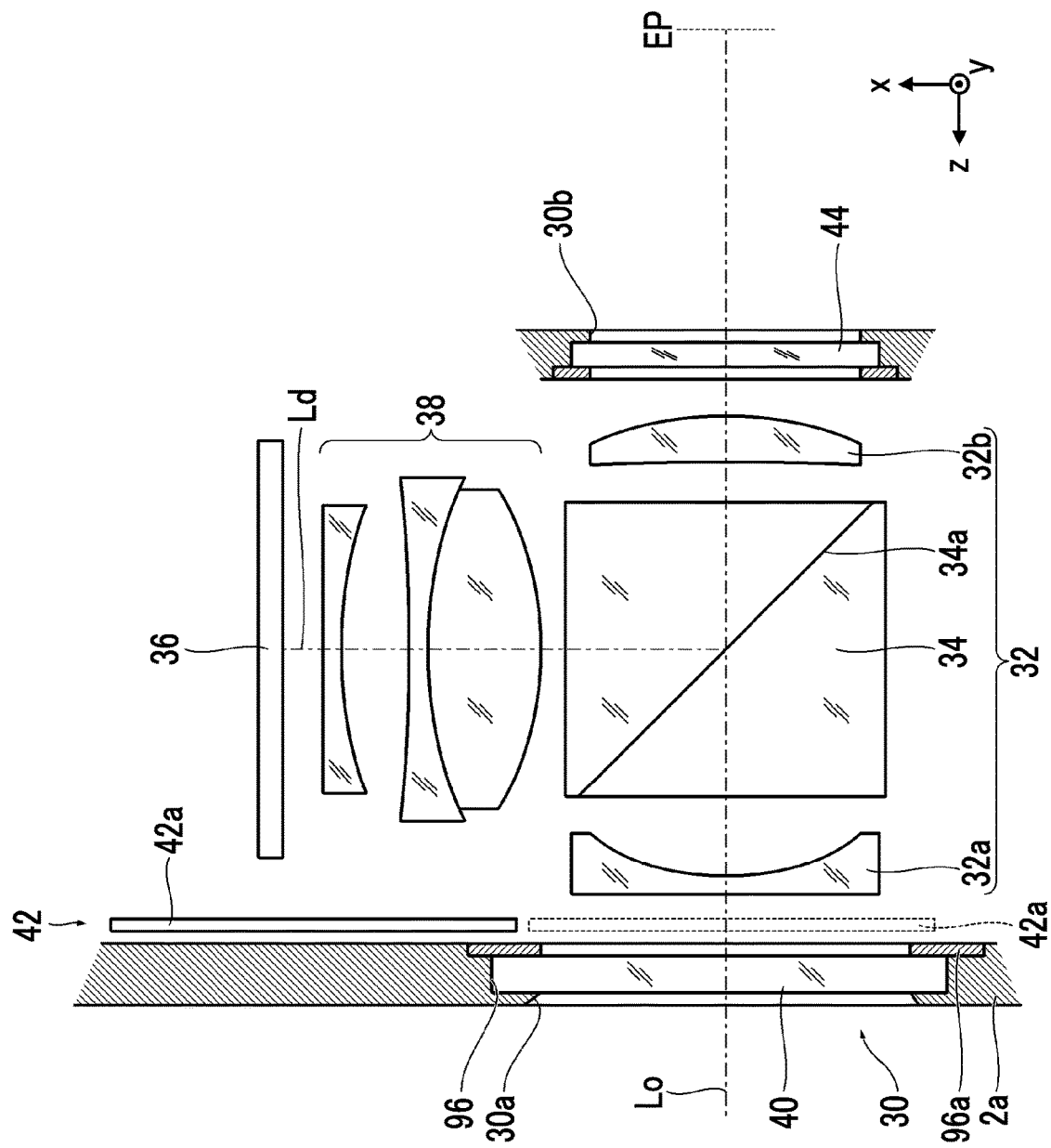
FIG. 3 is a cross-sectional plan view showing a configuration of a viewfinder.

FIG. 3 is a cross-sectional plan view showing the configuration of the viewfinder.

As shown in the drawing, the viewfinder 30 comprises an observation optical system 32, a beam splitter 34, a finder LCD 36, a target lens 38, a variable ND filter 40, a finder shutter 42, and a cover glass 44.

<Observation Optical System>

The observation optical system 32 is an optical system through which an optical image of a subject is observed. The observation optical system 32 is composed of an observation optical system of a reverse Galileo finder, and comprises an objective lens 32a having a negative refractive power and an eyepiece lens 32b having a positive refractive power. The finder window unit 30a and the finder eyepiece unit 30b of the viewfinder 30 are disposed on the optical axis Lo of the observation optical system 32.

<Beam Splitter>

The beam splitter 34 is composed of a prism type beam splitter in which two right-angle prisms are cemented, and has a semi-transparent film 34a on an inner slope thereof. The semi-transparent film 34a divides the light, which is perpendicularly incident into the incident surface of the beam splitter 34, into transmitted light and reflected light. The beam splitter 34 is an example of a superimposing optical element. The beam splitter 34 is disposed on the optical axis Lo of the observation optical system 32, and is disposed between the objective lens 32a and the eyepiece lens 32b.

<Finder LCD>

A finder liquid crystal display (LCD) 36 displays information to be superimposed on an optical image of a subject observed through the observation optical system 32 in a case where the viewfinder 30 is used as an OVF. The finder LCD 36 displays an image captured by the image sensor 52 (refer to FIG. 6) in real time in a case where the viewfinder 30 is used as an EVF. The finder LCD 36 is an example of a display device. The finder LCD 36 is composed of, for example, a transmissive LCD comprising a backlight. The finder LCD 36 is disposed on the optical axis Ld. The optical axis Ld is an optical axis that passes through the semi-transparent film 34a of the beam splitter 34 and is orthogonal to the optical axis Lo of the observation optical system 32.

<Target Lens>

The target lens 38 is disposed in an optical path between the finder LCD 36 and the beam splitter 34, and guides light from the finder LCD 36 to the eyepiece lens 32b.

<Variable ND Filter>

The variable neutral density (ND) filter 40 is provided in the finder window unit 30a, and adjusts the light amount of light incident into the observation optical system 32 by changing the transmittance (density) thereof.

In the digital camera 1 of the present embodiment, the variable ND filter 40 is composed of an electronic variable ND filter. The electronic variable ND filter is an ND filter that is able to electronically control the transmittance (density). In particular, in the digital camera 1 according to the present embodiment, an electronic variable ND filter composed of an electrochromic element is used.

An electrochromic element (EC element) is an optical element that utilizes an electrochromic phenomenon in which the color of a substance is reversibly changed by an electrochemical oxidation-reduction reaction caused by application of a voltage. The electrochromic element has a characteristic that the operating speed is slow since the electrochromic element utilizes a chemical reaction.

<Finder Shutter>

The finder shutter 42 opens and closes the finder window unit 30a. The finder shutter 42 comprises a finder shutter base plate 42a capable of blocking the opening of the finder window unit 30a, and a finder shutter driving unit 42b (refer to FIG. 6) for driving the finder shutter base plate 42a. The finder shutter base plate 42a is driven by a finder shutter driving unit 42b, and slides between a closed position (a position shown by a dashed line in FIG. 3) and an open position (a position shown by a solid line in FIG. 3), thereby opening and closing the finder window unit 30a.

In a case where the finder shutter base plate 42a moves to the closed position, the opening of the finder window unit 30a is closed by the finder shutter base plate 42a, and the observation optical system 32 is blocked from light. On the other hand, in a case where the finder shutter base plate 42a moves to the open position, the finder shutter base plate 42a is retracted from the optical path of the observation optical system 32, and the optical image of the subject can be observed through the observation optical system 32.

<Cover Glass>

The cover glass 44 is provided on the finder eyepiece unit 30b. The cover glass 44 is composed of a transparent glass plate.

<<Viewfinder Function>>

The viewfinder 30 configured as described above can be used by switching between an optical viewfinder (OVF) and an electronic viewfinder (EVF) by opening and closing the finder shutter 42.

<In a Case of Use as OVF>

In a case of using as an OVF, the finder shutter 42 is opened. In a case where the finder shutter 42 is opened, light from the subject is incident from the finder window unit 30a. The light incident from the finder window unit 30a is sequentially transmitted through the variable ND filter 40, the objective lens 32a, the beam splitter 34, the eyepiece lens 32b, and the cover glass 44, and is incident on the eye point EP. Thereby, the optical image of the subject is observed at the eye point EP.

In a case where an image is displayed on the finder LCD 36 with the finder shutter 42 opened, light from the finder LCD 36 is incident into the beam splitter 34 through the target lens 38. The light incident into the beam splitter 34 is reflected by the semi-transparent film 34a, and is incident on the eye point EP through the eyepiece lens 32b. Thereby, at the eye point EP, the display of the finder LCD 36 is observed while being superimposed on the optical image of the subject by the observation optical system 32.

Figure 4:
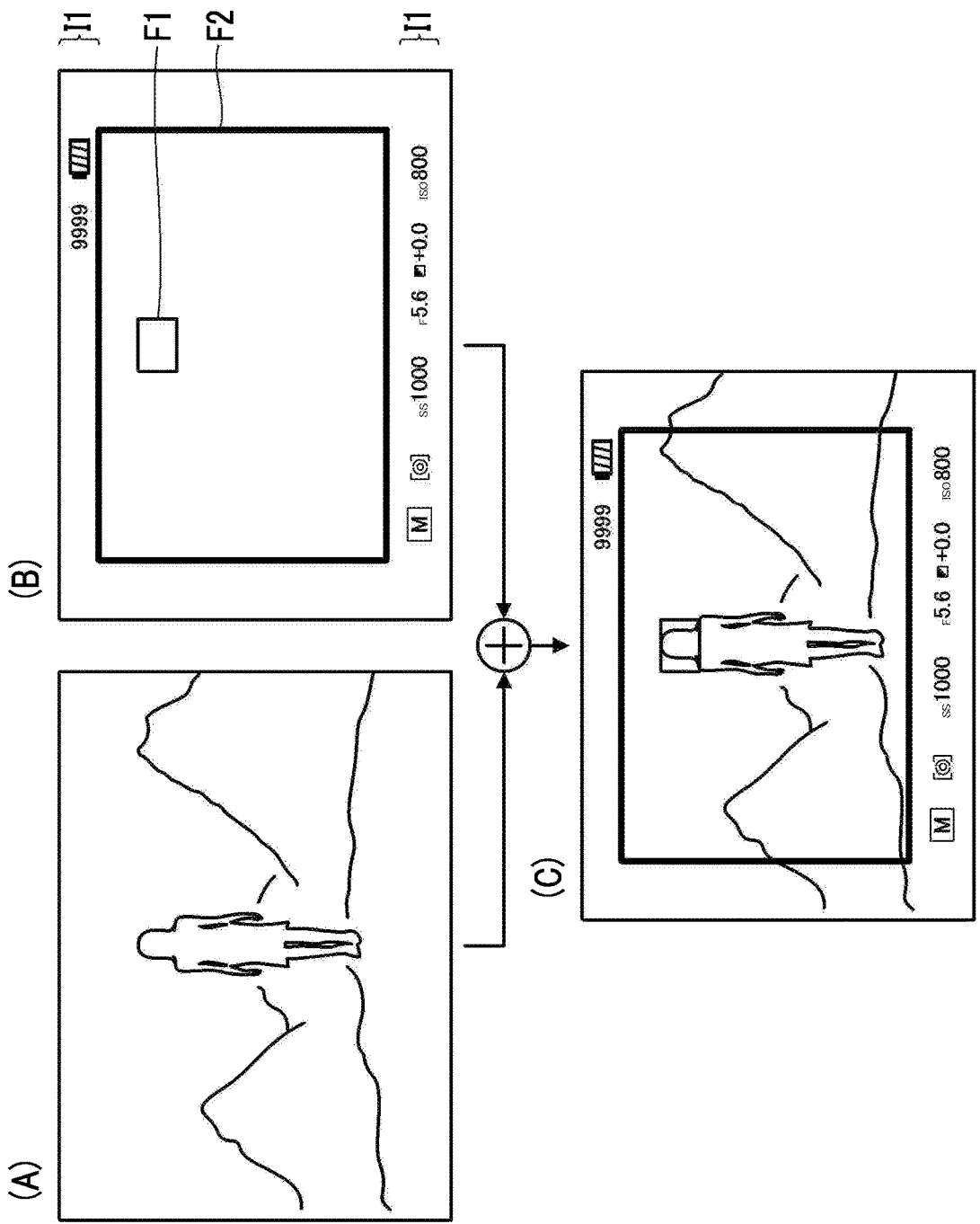
FIG. 4 is a conceptual diagram of OVF superimposed display.

FIG. 4 is a conceptual diagram of OVF superimposed display.

FIG. 4(A) is an OVF screen observed from the finder eyepiece unit 30b through the observation optical system 32. FIG. 4(B) shows a screen of the finder LCD 36. In the example shown in the drawing, an example is shown in which a visual field frame F1, an AF frame F2, and imaging information I1 are displayed on the finder LCD 36. The visual field frame F1 is a frame indicating a imaging range. The AF frame F2 is a frame indicating an area to be in focus during auto focus (AF). The imaging information I1 includes an imaging mode, an exposure mode, a shutter speed, a stop value, an exposure compensation amount, a sensitivity, the number of images that can be captured, a remaining battery capacity, and the like. The imaging information I1 is displayed in a margin around the visual field frame F1. FIG. 4(C) shows an OVF screen on which the display of the finder LCD 36 is superimposed. As shown in FIG. 4(C), in a case where an image is displayed on the finder LCD 36 with the finder shutter 42 opened, the image displayed on the finder LCD 36 is displayed on the OVF screen. In a case where the display of the finder LCD 36 is turned off, only the optical image is observed as shown in FIG. 4(A).

<In Case of Use as EVF>

In a case of using the viewfinder 30 as an EVF, the finder shutter 42 is closed. In a case where an image is displayed on the finder LCD 36 with the finder shutter 42 closed, only the display on the finder LCD 36 is observed at the eye point EP. Therefore, in a case where the finder shutter 42 is closed and the image captured by the image sensor 52 is displayed on the finder LCD 36 in real time, the viewfinder 30 can be used as an EVF.

<Switching between OVF and EVF>

Figure 5:
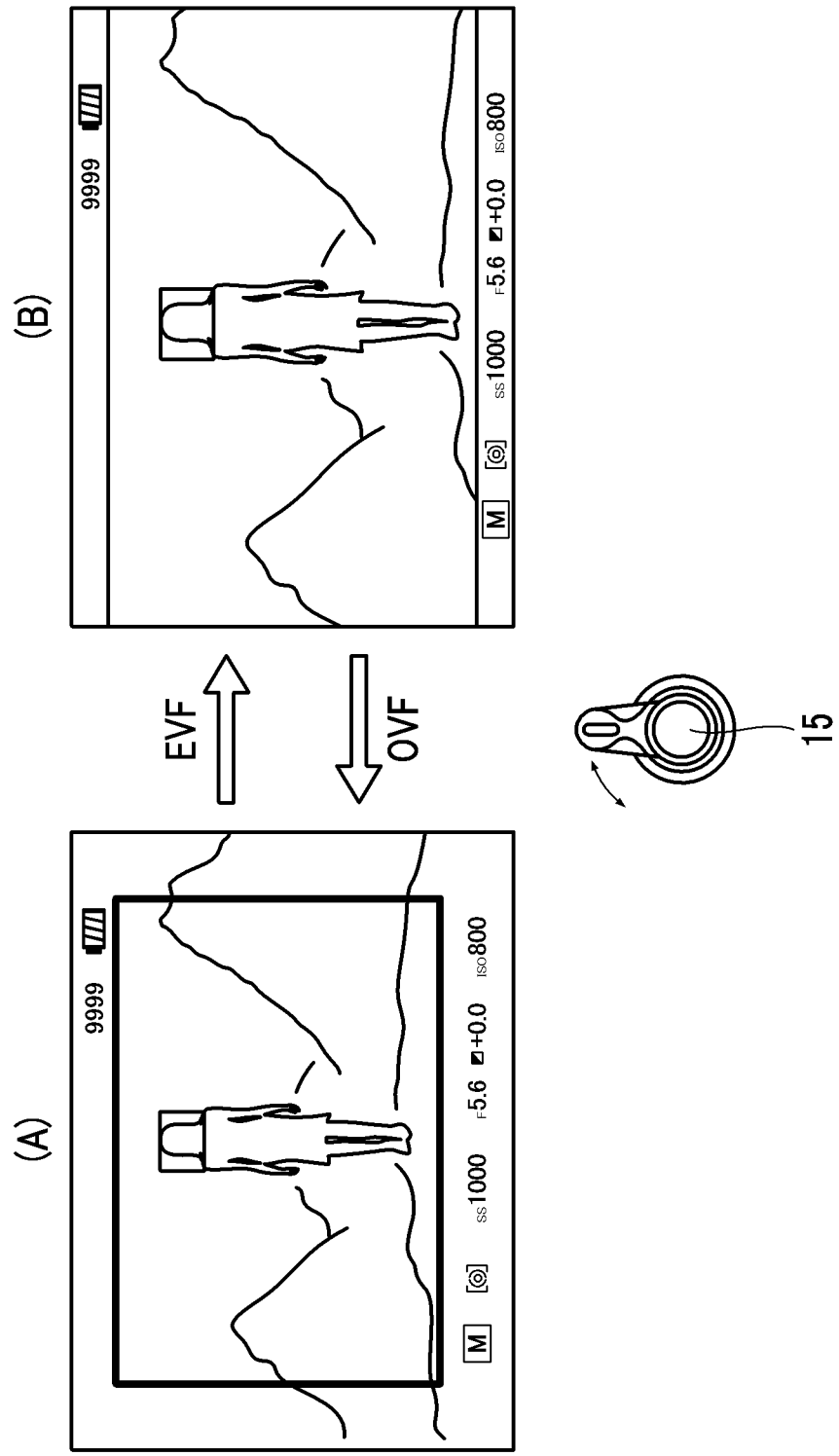
FIG. 5 is a conceptual diagram of switching between OVF and EVF.

FIG. 5 is a conceptual diagram of switching between OVF and EVF.

FIG. 5(A) shows an OVF screen, and FIG. 5(B) shows an EVF screen. Switching between the OVF and the EVF is performed by the finder switching lever 15, and the OVF and the EVF are alternately switched each time the finder switching lever 15 is swung.

[Electrical Configuration of Digital Camera]

Figure 6:
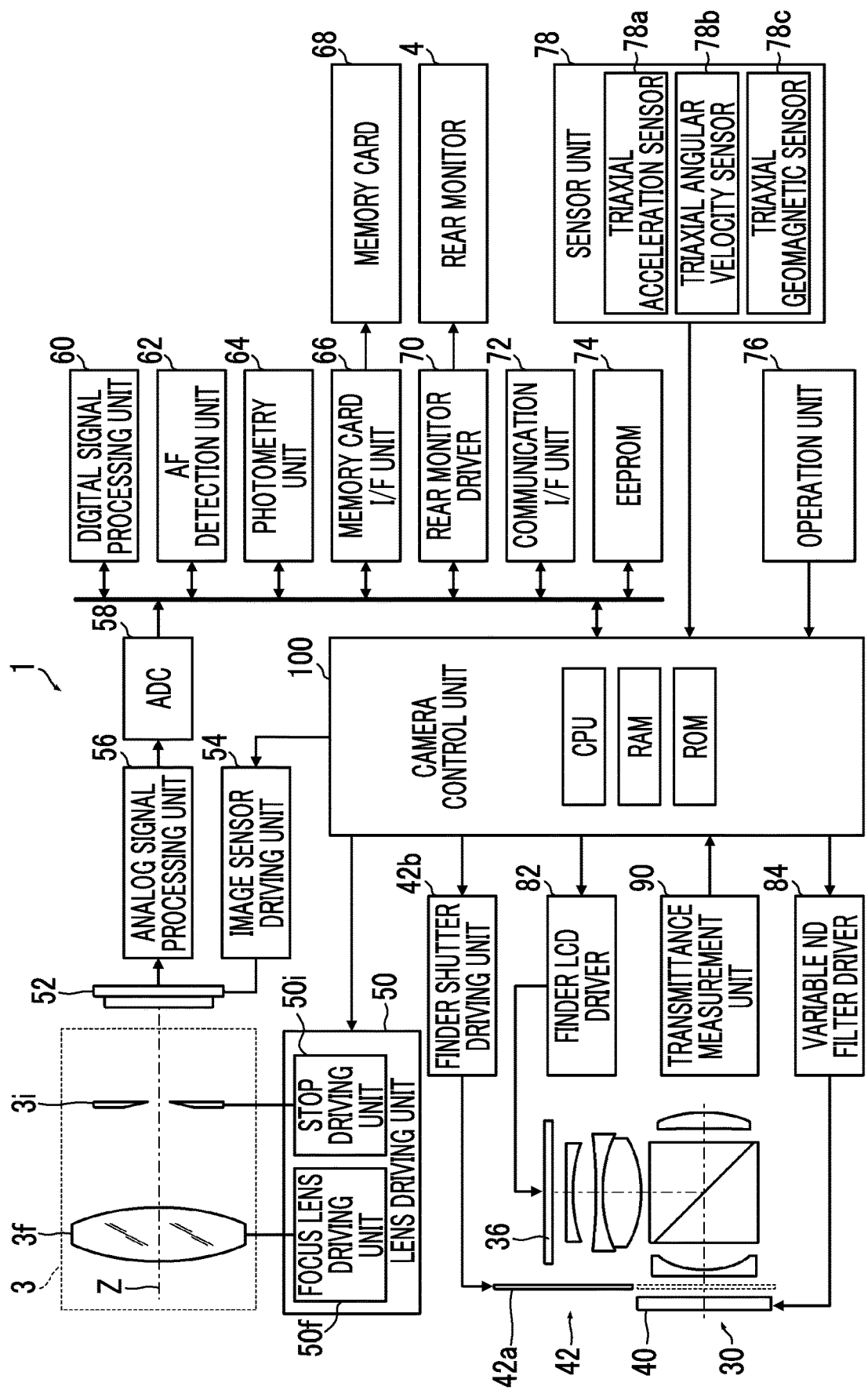
FIG. 6 is a diagram showing an electrical schematic configuration of the digital camera.

FIG. 6 is a diagram showing an electrical schematic configuration of the digital camera.

As shown in the drawing, the digital camera 1 comprises an imaging lens 3, a lens driving unit 50, an image sensor 52, an image sensor driving unit 54, an analog signal processing unit 56, an analog-to-digital converter (ADC) 58, a digital signal processing unit 60, an AF detection unit 62, a photometry unit 64, a memory card interface (I/F) unit 66, a memory card 68, a rear monitor 4, a rear monitor driver 70, a communication interface (I/F) unit 72, an electrically erasable programmable read-only memory (EEPROM) 74, an operation unit 76, a sensor unit 78, a finder shutter 42, a finder LCD 36, a finder LCD driver 82, a variable ND filter 40, a variable ND filter driver 84, a transmittance measurement unit 90, a camera control unit 100, and the like.

<<Imaging Lens and Lens Driving Unit>>

The imaging lens 3 is configured by combining a plurality of lenses. The imaging lens 3 has a focus adjustment mechanism, and the focus is adjusted by moving a part of the lens (focus lens) 3f back and forth along the optical axis Z. Further, the imaging lens 3 comprises a stop 3i, and the light amount is adjusted by adjusting the opening amount of the stop 3i. The stop 3i is composed of, for example, an iris stop.

The lens driving unit 50 comprises a focus lens driving unit 50f that drives the focus lens 3f and a stop driving unit 50i that drives the stop 3i.

The focus lens driving unit 50f moves the focus lens 3f back and forth along the optical axis Z. The focus lens driving unit 50f comprises an actuator such as a motor and a driving circuit therefor. The focus lens driving unit 50f is controlled by the camera control unit 100. The camera control unit 100 controls the focus lens driving unit 50f, thereby controlling the movement of the focus lens 3f.

The stop driving unit 50i enlarges or reduces the opening portion of the stop 3i. The stop driving unit 50i comprises an actuator such as a motor and a driving circuit thereof. The stop driving unit 50i is controlled by the camera control unit 100. The camera control unit 100 controls the stop driving unit 50i, thereby controlling the opening amount of the stop 3i.

<<Image Sensor and Image Sensor Driving Unit>>

The image sensor 52 captures an image of a subject through the imaging lens 3. The image sensor 52 is composed of a solid-state imaging element such as a charged coupled device (CCD) and a complementary metal oxide semiconductor (CMOS).

The image sensor driving unit 54 causes the image sensor 52 to capture an image by driving the image sensor 52. The image sensor driving unit 54 is controlled by the camera control unit 100. The camera control unit 100 controls the image sensor driving unit 54, thereby controlling the imaging by the image sensor 52.

<<Analog Signal Processing Unit and Analog-to-Digital Converter>>

The analog signal processing unit 56 captures an analog image signal for each pixel output from the image sensor 52 and performs predetermined signal processing such as correlated double sampling processing and amplification processing.

An analog-to-digital converter (ADC) 58 converts an analog image signal, which is output from the analog signal processing unit 56, into a digital image signal and outputs the digital image signal.

<<Digital Signal Processing Unit>>

The digital signal processing unit 60 captures a digital image signal, which is output from the analog-to-digital converter 58, and performs predetermined signal processing such as gradation conversion processing, white balance correction processing, gamma correction processing, synchronization processing, and YC conversion processing, thereby generating image data.

<<AF Detection Unit>>

The AF detection unit 62 captures a digital image signal, which is output from the analog-to-digital converter 58, and calculates information about a focus evaluation value necessary for auto focus (AF) control in a contrast method.

<<Photometry Unit>>

The photometry unit 64 captures a digital image signal, which is output from the analog-to-digital converter 58, and detects the brightness (luminance) of the subject.

<<Memory Card Interface Unit and Memory Card>>

The memory card interface unit 66 reads and writes data from and to a memory card 68 inserted in a card slot.

<<Rear Monitor and Rear Monitor Driver>>

The rear monitor 4 is used not only for reproducing a captured image, but also as a setting screen for various settings. The rear monitor 4 is used as a live view monitor in accordance with a user's selection. That is, in a case where the use of the rear monitor 4 is selected by the view mode button 17, the image captured by the image sensor 52 is displayed on the rear monitor 4 in real time. Thus, the rear monitor 4 is used as a live view monitor.

The display on the rear monitor 4 is controlled by the camera control unit 100. The camera control unit 100 controls the display on the rear monitor 4 through the rear monitor driver 70.

<<Communication Interface Unit>>

The communication interface unit 72 communicates with an external device in a prescribed communication format. The communication is controlled by the camera control unit 100.

<<EEPROM>>

The EEPROM 74 is a non-volatile memory that can be additionally written, and stores data necessary for controlling the digital camera 1 and the like. The EEPROM 74 is an example of a scheduled-imaging image information storage unit, and stores information of a scheduled-imaging place and scheduled-imaging information.

<<Operation Unit>>

The operation unit 76 outputs a signal to the camera control unit 100 in accordance with an operation of each operation member (such as the power lever 11, the shutter button 12, the exposure compensation dial 13, the shutter speed dial 14, the finder switching lever 15, the command dial 16, the view mode button 17, the reproduction button 18, the erase button 19, the function button 20, the AE/AF lock button 21, the selector button 22, the OK button 23, the menu button 24, and the DISP/BACK button 25) provided on the camera body 2.

<<Sensor Unit>>

The sensor unit 78 detects the movement of the digital camera 1, the current position, and the like. The sensor unit 78 comprises a triaxial acceleration sensor 78a, a triaxial angular velocity sensor 78b, and a triaxial geomagnetic sensor 78c.

The triaxial acceleration sensor 78a detects the acceleration of the digital camera 1 in the triaxial directions. The triaxial angular velocity sensor 78b detects the angular velocity of the digital camera 1 around three axes. The triaxial geomagnetic sensor 78c detects the geomagnetism of the digital camera 1 in the triaxial directions, thereby detecting the orientation thereof.

Here, the three axes (x axis, y axis, z axis) are set as follows on the basis of the light receiving surface of the image sensor 52. That is, the horizontal axis passing through the center of the light receiving surface of the image sensor 52 is set as the x axis, and the vertical axis passing through the center of the light receiving surface of the image sensor 52 is set as the y axis. An axis passing through the center of the light receiving surface of the image sensor 52 and perpendicular to the light receiving surface is set as a z axis. The x, y, and z axes are orthogonal to each other.

The image sensor 52 has a horizontally long aspect ratio (for example, horizontal:vertical=3:2), and the long side thereof is set parallel to the x axis and the short side thereof is set parallel to the y axis. In the digital camera 1, the bottom surface of the camera body 2 is set parallel to the x axis. In the digital camera 1, the optical axis Z of the imaging lens 3 coincides with the z axis.

The imaging orientation and the imaging attitude of the digital camera 1 are obtained on the basis of the outputs of the triaxial acceleration sensor 78a, the triaxial angular velocity sensor 78b, and the triaxial geomagnetic sensor 78c. That is, the orientation (imaging orientation) to which the light receiving surface of the image sensor 52 faces and the attitude (imaging attitude) of the image sensor 52 based on the horizontal and vertical directions are obtained. The imaging attitude is specified by, for example, a rotation angle around the x axis, a rotation angle around the y axis, and a rotation angle around the z axis of the image sensor 52 based on the horizontal and vertical directions. Thereby, attitudes such as imaging at the vertical position, imaging at the horizontal position, and the tilt can be specified.

<<Finder Shutter>>

The finder shutter 42 comprises the finder shutter base plate 42a and a finder shutter driving unit 42b that drives the finder shutter base plate 42a. The finder shutter driving unit 42b comprises an actuator such as a motor and a driving circuit therefor. The finder shutter driving unit 42b is controlled by the camera control unit 100. The camera control unit 100 controls the finder shutter driving unit 42b, thereby controlling the opening and closing of the finder window unit 30a through the finder shutter 42.

<<Finder LCD and Finder LCD Driver>>

The display of the finder LCD 36 is controlled by the camera control unit 100. The camera control unit 100 controls the display on the finder LCD 36 through the finder LCD driver 82.

It should be noted that the display control of the finder LCD 36 performed by the camera control unit 100 includes control of the light amount of the finder LCD 36. This point will be described later.

<<Variable ND Filter and Variable ND Filter Driver>>

The transmittance (density) of the variable ND filter 40 is controlled by the camera control unit 100 through the variable ND filter driver 84. The transmittance of the variable ND filter 40 is switched in accordance with the brightness of external light. The switching of the transmittance will be described later.

<<Transmittance Measurement Unit>>

The transmittance measurement unit 90 measures the transmittance of the variable ND filter 40.

Figure 7:
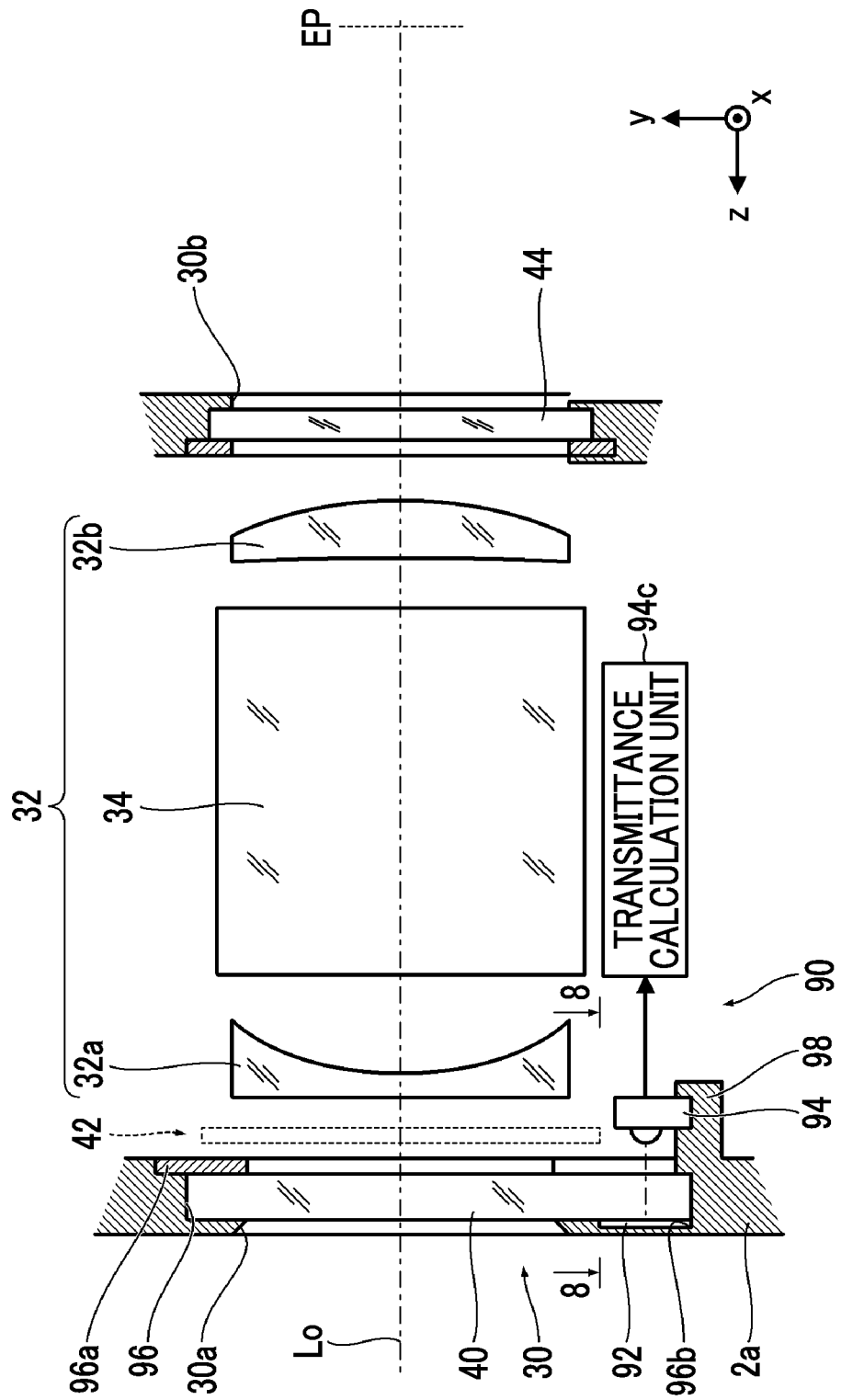
FIG. 7 is a side sectional view showing a configuration of a transmittance measurement unit.
Figure 8:
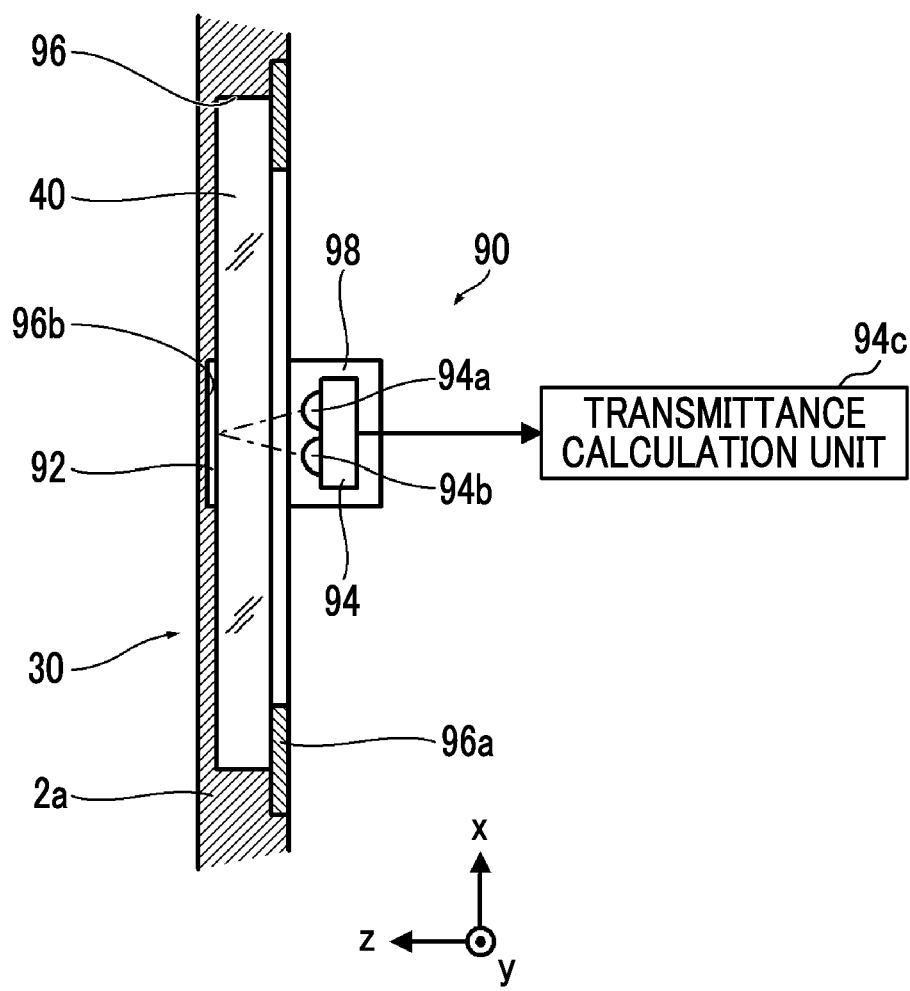
FIG. 8 is a cross-sectional view taken along the line 8-8 in FIG. 7.

FIG. 7 is a side sectional view showing the configuration of the transmittance measurement unit. FIG. 8 is a cross-sectional view taken along the line 8-8 of FIG. 7.

As shown in FIGS. 7 and 8, the transmittance measurement unit 90 comprises a reflective member 92 and a transmittance measurement unit 94.

<Reflective Member>

The reflective member 92 is composed of a plate-like mirror. The reflective member 92 is provided on the holding unit 96 of the variable ND filter 40.

The holding unit 96 of the variable ND filter 40 is provided on the exterior body 2a of the camera body 2, as shown in FIGS. 7 and 8. As shown in FIGS. 7 and 8, the holding unit 96 of the variable ND filter 40 is provided at the position of the finder window unit 30a inside the exterior body 2a of the camera body 2. The holding unit 96 is configured as a frame-shaped recess into which the variable ND filter 40 is fitted. The variable ND filter 40 is fitted into the holding unit 96 and attached to the finder window unit 30a.

The variable ND filter 40 fitted into the holding unit 96 is fixed by being interposed between the holding unit 96 and the stopper plate 96a. The stopper plate 96a has a frame shape, and is fixed to the exterior body 2a with screws (not shown).

The reflective member 92 is attached to a reflective member attachment unit 96b provided in the holding unit 96 of the variable ND filter 40. The reflective member attachment unit 96b is configured as a recess portion into which the reflective member 92 is fitted. The reflective member 92 is fitted into the recess portion and attached to the reflective member attachment unit 96b.

The reflective member 92 attached to the reflective member attachment unit 96b is disposed in parallel with the variable ND filter 40 held by the holding unit 96.

<Transmittance Measurement Unit>

The transmittance measurement unit 94 measures the transmittance of the variable ND filter 40 by using light. The variable ND filter 40 is disposed at a position facing the reflective member 92 with the variable ND filter 40 interposed therebetween. A transmittance measurement unit attachment unit 98, to which the transmittance measurement unit 94 is attached, is provided inside the exterior body 2a of the camera body 2.

The transmittance measurement unit 94 comprises a light emitting unit 94a, a light receiving unit 94b, and a transmittance calculation unit 94c. The light emitting unit 94a and the light receiving unit 94b are disposed to face the reflective member 92 with the variable ND filter 40 interposed therebetween.

The light emitting unit 94a emits a prescribed light amount toward the reflective member 92. The light emitting unit 94a is composed of a light emitting element such as a semiconductor light emitting diode (LED).

The light receiving unit 94b receives light emitted from the light emitting unit 94a and reflected by the reflective member 92, and measures the received light amount. The light receiving unit 94b is composed of, for example, a semiconductor light receiving element. In a case where the variable ND filter 40 is held by the holding unit 96, the light transmitted through the variable ND filter 40 is received by the light receiving unit 94b. The light emitted from the light emitting unit 94a is transmitted through the variable ND filter 40 twice and is received by the light receiving unit 94b.

The transmittance calculation unit 94c acquires information about the received light amount from the light receiving unit 94b, and calculates the transmittance of the variable ND filter 40.

The measurement of the transmittance is performed intermittently. For example, the measurement is performed at intervals of several tens ms to several hundreds ms.

<<Camera Control Unit>>

The camera control unit 100 is a control unit that controls the overall operation of the digital camera 1. The camera control unit 100 is composed of, for example, a microcomputer comprising a central processing unit (CPU), a random access memory (RAM), and a read only memory (ROM). Thus, various functions are realized by executing a predetermined program (such as a finder display control program). The medium, in which the predetermined program (such as a finder display control program) is stored, may be a non-transitory and computer-readable recording medium such as a hard disk, a compact disk (CD), a digital versatile disk (DVD), and various semiconductor memories.

Figure 9:
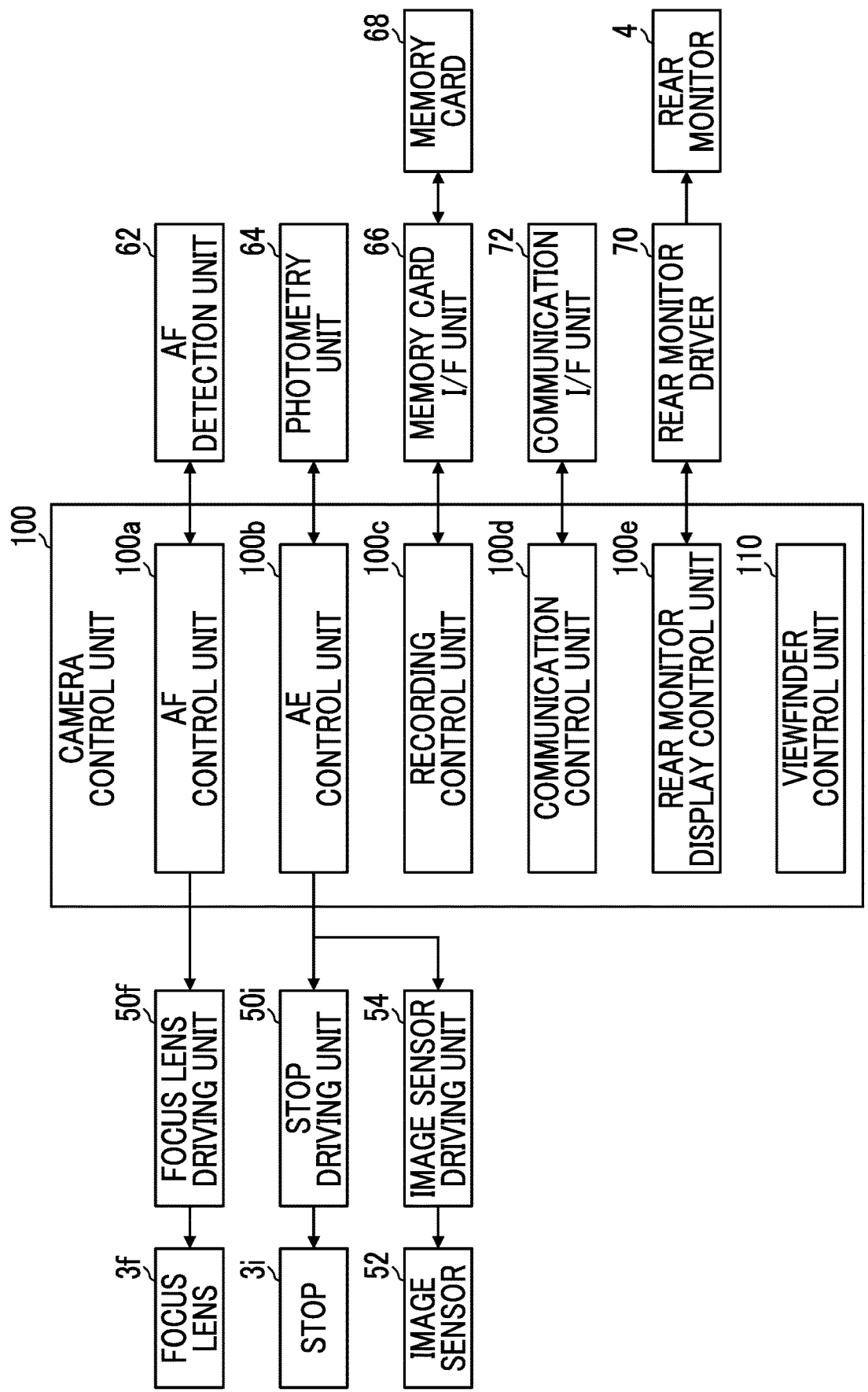
FIG. 9 is a block diagram of main functions realized by a camera control unit.

FIG. 9 is a block diagram of main functions realized by the camera control unit.

As shown in the drawing, the camera control unit 100 functions as an AF control unit 100a, an AE control unit 100b, a recording control unit 100c, a communication control unit 100d, a rear monitor display control unit 100e, a viewfinder control unit 110, and the like.

<AF Control Unit>

The AF control unit 100a performs contrast-type auto focus (AF) control on the basis of the result of detection of the AF detection unit 62. The AF control unit 100a moves the focus lens 3f from the closest end to the infinity end, detects a position where the focus evaluation value is the maximum, and moves the focus lens 3f to the detected position.

<AE Control Unit>

The AE control unit 100b performs Automatic Exposure (AE) control for obtaining an appropriate exposure on the basis of the result of photometry of the photometry unit 64. The AE control unit 100b calculates an exposure value (EV) value on the basis of the result of photometry of the photometry unit 64. The AE control unit 100b determines a stop value and a shutter speed on the basis of the calculated EV value. The AE control unit 100b controls the stop 3i through the stop driving unit 50i such that the stop value becomes the determined stop value. In addition, the AE control unit 100b controls the image sensor 52 through the image sensor driving unit 54 such that the shutter speed becomes the determined shutter speed. That is, the exposure time of the image sensor 52 is controlled such that exposure is performed at the determined shutter speed.

<Recording Control Unit>

The recording control unit 100c controls writing and reading of data to and from the memory card 68 through the memory card interface unit 66. The image data obtained through imaging is recorded on a memory card 68 through a memory card interface unit 66. The image data recorded on the memory card 68 is read from the memory card 68 through the memory card interface unit 66.

<Communication Control Unit>

The communication control unit 100d controls communication with an external device through the communication interface unit 72.

<Rear Monitor Display Control Unit>

The rear monitor display control unit 100e controls display on the rear monitor 4. As described above, the rear monitor 4 is used not only for reproducing a captured image, but also as a setting screen for various settings. The rear monitor 4 is used as a live view monitor in accordance with a user's selection. The rear monitor display control unit 100e controls the display of the rear monitor 4 through the rear monitor driver 70.

<Viewfinder Control Unit>

The viewfinder control unit 110 controls the viewfinder 30.

Figure 10:
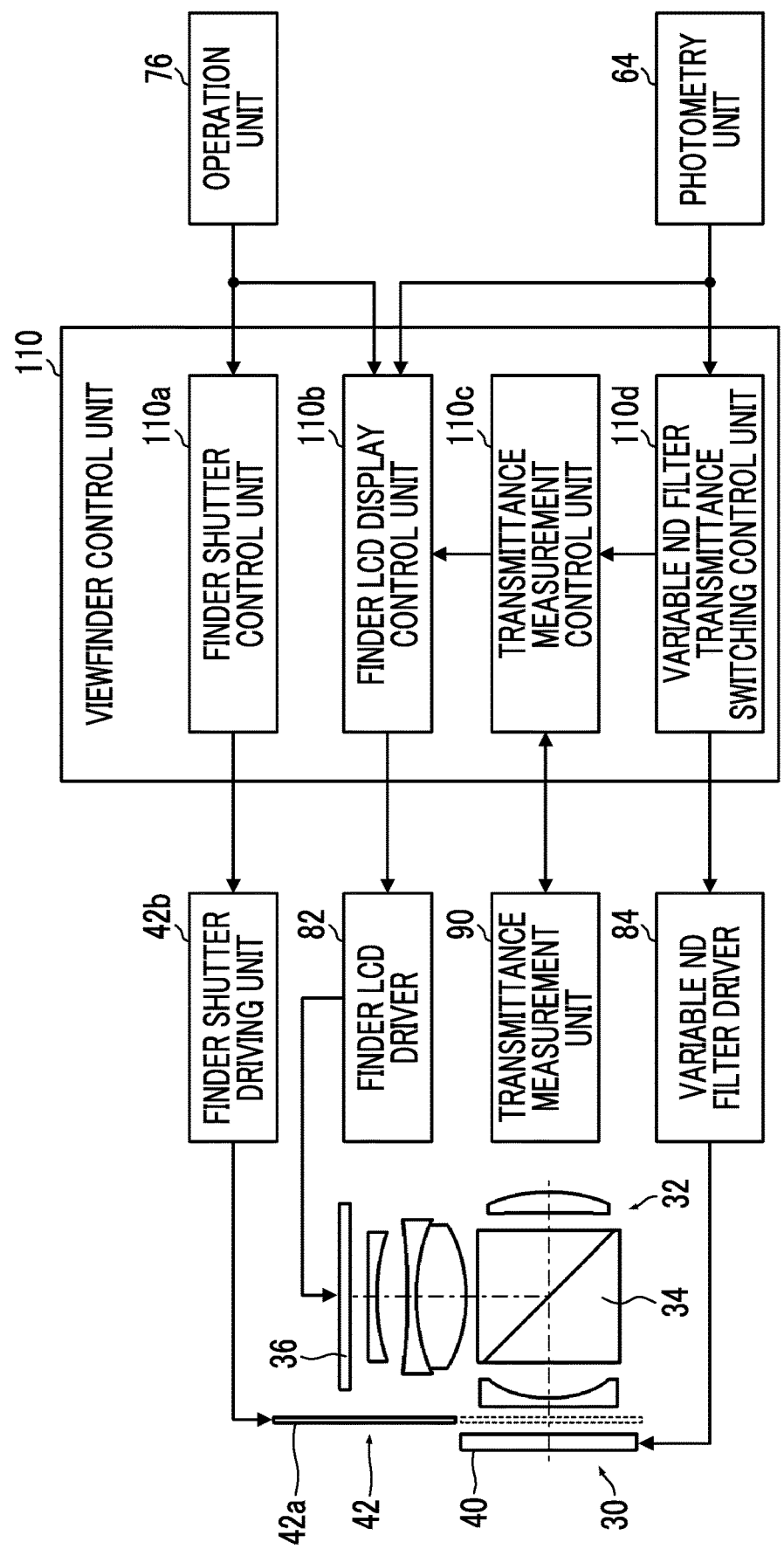
FIG. 10 is a block diagram of functions realized by a viewfinder control unit.

FIG. 10 is a block diagram of functions realized by the viewfinder control unit.

The viewfinder control unit 110 realizes functions such as a finder shutter control unit 110a, a finder LCD display control unit 110b, a transmittance measurement control unit 110c, and a variable ND filter transmittance switching control unit 110d.

[Finder Shutter Control Unit]

The finder shutter control unit 110a controls the opening and closing of the finder shutter 42 on the basis of the switching operation between OVF and EVF by the finder switching lever 15. The finder shutter control unit 110a opens the finder shutter 42 in a case where the OVF is selected by the finder switching lever 15, and closes the finder shutter 42 in a case where the EVF is selected. The finder shutter control unit 110a controls opening and closing of the finder shutter 42 through the finder shutter driving unit 42b.

[Finder LCD Display Control Unit]

The finder LCD display control unit 110b controls the display of the finder LCD 36. In a case where OVF is selected, the finder LCD display control unit 110b causes the finder LCD 36 to display information such as a visual field frame, an AF frame, and imaging information (refer to FIG. 5(A)). On the other hand, in a case where EVF is selected, the finder LCD display control unit 110b causes the finder LCD 36 to display the image captured by the image sensor 52 in real time (refer to FIG. 5(B)).

Further, the finder LCD display control unit 110b controls the light amount of the finder LCD 36 on the basis of the result of photometry performed by the photometry unit 64 and the transmittance of the variable ND filter 40 measured by the transmittance measurement unit 90. This point will be described later.

[Transmittance Measurement Control Unit]

The transmittance measurement control unit 110c controls the transmittance measurement of the variable ND filter 40 measured by the transmittance measurement unit 90. The transmittance measurement unit 90 measures the transmittance of the variable ND filter 40 in a case where the transmittance of the variable ND filter 40 is switched.

As described above, the variable ND filter 40 of the present embodiment is composed of an electrochromic element (EC element). The electrochromic element has a characteristic that the operating speed is slow. Therefore, even in a case where the switching is instructed, the switching is not performed instantaneously, and a certain time is necessary until the target transmittance is obtained.

The transmittance measurement unit 90 measures the transmittance of the variable ND filter 40 that changes over time in a case where the transmittance of the variable ND filter 40 is switched. The transmittance measurement control unit 110c controls the measurement. That is, in a case where the transmittance of the variable ND filter 40 is switched, the transmittance measurement unit 90 is controlled to measure the transmittance in real time until the transmittance of the variable ND filter 40 reaches the target transmittance.

[Variable ND Filter Transmittance Switching Control Unit]

The variable ND filter transmittance switching control unit 110d controls switching of the transmittance of the variable ND filter 40. The variable ND filter transmittance switching control unit 110d is an example of a transmittance switching control unit.

Here, the digital camera 1 of the present embodiment has a configuration in which the transmittance of the variable ND filter 40 can be switched in two stages. That is, the configuration is such that the transmittance of the variable ND filter 40 can be selectively switched between the first transmittance and the second transmittance. Here, the first transmittance is 100%, and the second transmittance is 80%.

The variable ND filter transmittance switching control unit 110d switches the transmittance of the variable ND filter 40 on the basis of the result of photometry performed by the photometry unit 64. Specifically, in a case where the brightness (luminance) of the subject measured by the photometry unit 64 is less than a predetermined threshold value BT, the transmittance of the variable ND filter 40 is set as the first transmittance. On the other hand, in a case where the brightness (luminance) of the subject measured by the photometry unit 64 is equal to or greater than the predetermined threshold value BT, the transmittance of the variable ND filter 40 is set as the second transmittance. That is, in a case where the brightness is greater than a certain level, the transmittance of the variable ND filter 40 is reduced. Thus, in a case where the OVF is used in a bright environment, the visibility of the display on the finder LCD 36 can be improved.

The threshold value BT is set in consideration of the visibility of the display in the finder. For example, as described later, in a case where the light amount of the finder LCD 36 is controlled in accordance with the brightness of the subject, the light amount of the finder LCD 36 reaches an upper limit at a certain brightness. That is, it becomes impossible to increase the light amount further. The threshold value BT is set as the value of the brightness of the subject in a case where the light amount of the finder LCD 36 reaches the upper limit (refer to FIG. 11).

The variable ND filter transmittance switching control unit 110d controls the switching of the transmittance of the variable ND filter 40 only in a case where the OVF is used.

<Control of Light Amount in Finder LCD>

As described above, the finder LCD display control unit 110b controls the light amount of the finder LCD 36 on the basis of the result of photometry performed by the photometry unit 64 and the transmittance of the variable ND filter 40 measured by the transmittance measurement unit 90. The finder LCD display control unit 110b is an example of a display device light amount control unit.

[Control of Light Amount in Finder LCD Based on Result of Photometry Performed by Photometry Unit]

The finder LCD display control unit 110b controls the light amount of the finder LCD 36 on the basis of the result of photometry performed by the photometry unit 64. That is, the light amount of the finder LCD 36 is controlled in accordance with the brightness (luminance) of the subject.

The finder LCD display control unit 110b controls the driving of the backlight provided in the finder LCD 36, thereby controlling the light amount of the finder LCD 36. For example, the backlight application voltage is driven by pulse width modulation (PWM), thereby controlling the light amount of the finder LCD 36.

Figure 11:
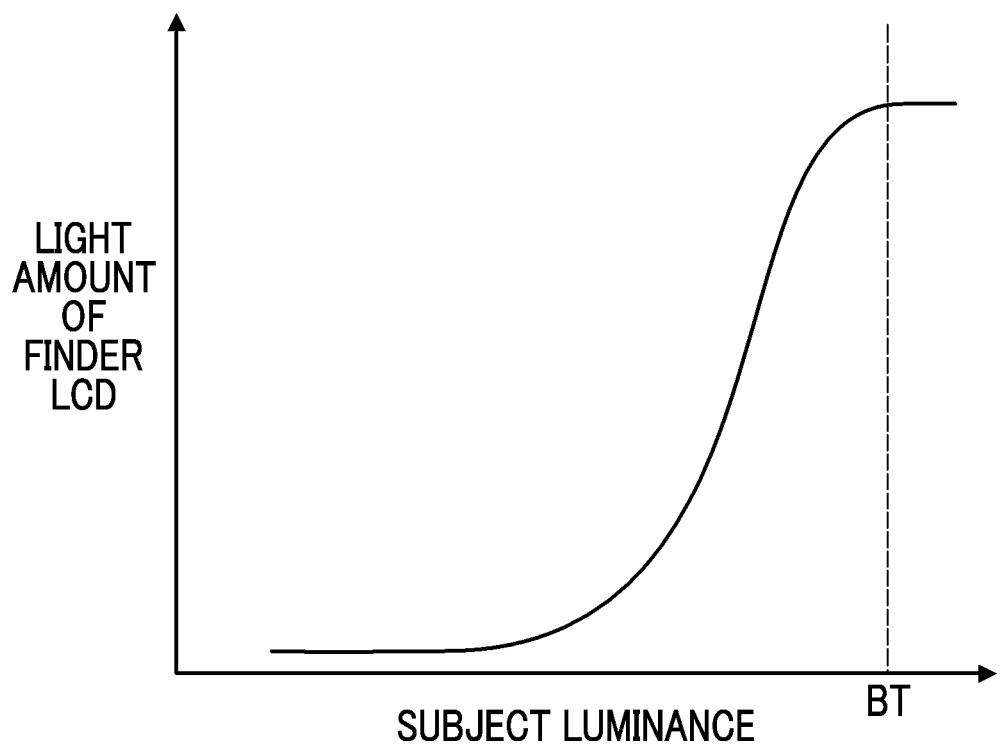
FIG. 11 is a graph showing the relationship between a brightness of a subject (subject luminance) and a light amount of a finder LCD.

FIG. 11 is a graph showing the relationship between the brightness of the subject (subject luminance) and the light amount of the finder LCD.

As shown in the drawing, the finder LCD display control unit 110b controls the light amount of the finder LCD 36 on the basis of the result of photometry (subject luminance) performed by the photometry unit 64. More specifically, driving of the backlight is controlled.

As described above, by controlling the light amount of the finder LCD 36 in accordance with the brightness of the subject, it is possible to constantly maintain favorable visibility of the display in the finder in a range from a bright environment to a dark environment.

[Control of Light Amount of Finder LCD Based on Result of Measurement of Transmittance of Variable ND Filter]

In a case where the transmittance of the variable ND filter 40 is switched, the finder LCD display control unit 110b controls the light amount of the finder LCD 36 on the basis of the transmittance of the variable ND filter 40 measured by the transmittance measurement unit 90.

As described above, the variable ND filter 40 requires a certain time before switching to the target transmittance. The finder LCD display control unit 110b controls the light amount of the finder LCD 36 in real time on the basis of the transmittance of the variable ND filter 40 measured by the transmittance measurement unit 90 until the variable ND filter 40 switches to the target transmittance. Specifically, the light amount ratio of the optical image of the subject observed through the observation optical system 32 and the display of the finder LCD 36 superimposed on the optical image is kept constant (including the range in which the light amount ratio is considered to be substantially constant). In such a manner, the light amount of the finder LCD 36 is controlled in real time.

Figure 12:
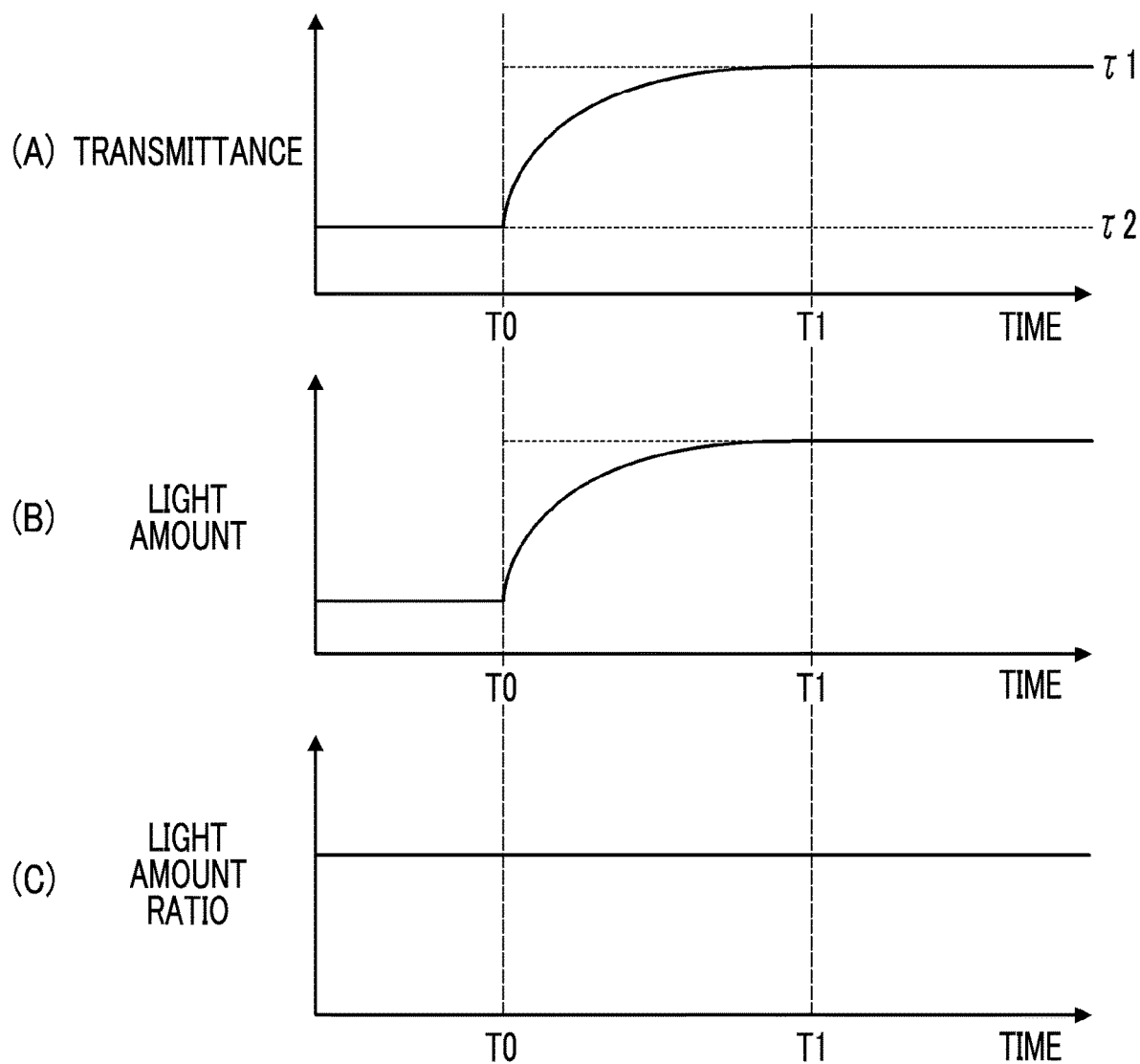
FIG. 12 is a graph showing a relationship between temporal change in transmittance of the variable ND filter, control of the light amount of the finder LCD based on the temporal change in transmittance, and a light amount ratio realized by the control.

FIG. 12 is a graph showing a relationship between temporal change in transmittance of the variable ND filter, control of the light amount of the finder LCD based on the temporal change in transmittance, and a light amount ratio realized by the control.

(A) of the drawing is a graph showing change with time in the transmittance of the variable ND filter. The horizontal axis represents time, and the vertical axis represents the transmittance of the variable ND filter. The drawing shows an example in which the transmittance of the variable ND filter 40 is switched from the second transmittance τ2 to the first transmittance τ1 at the time T0. As shown in the drawing, even in a case where the transmittance of the variable ND filter 40 is instructed to be switched, the transmittance is not immediately switched, and it takes a certain time to switch the transmittance to the target transmittance (first transmittance τ1). In the example shown in the drawing, the switching to the target transmittance (first transmittance τ1) is completed at the time T1.

FIG. 12(B) is a graph showing change in light amount of the finder LCD in a case where control is performed on the basis of change with time in the transmittance of the variable ND filter. The horizontal axis represents time, and the vertical axis represents the light amount of the finder LCD 36.

As shown in FIG. 12(A) and FIG. 12(B), the light amount of the finder LCD 36 is adjusted in real time in accordance with the change in transmittance of the variable ND filter 40.

FIG. 12(C) is a graph showing temporal change in light amount ratio of the optical image of the subject observed through the observation optical system 32 and the display of the finder LCD 36 superimposed on the optical image. The horizontal axis represents time, and the vertical axis represents the light amount ratio.

As shown in the drawing, the light amount of the finder LCD 36 is adjusted in real time according to the change in transmittance of the variable ND filter 40, and the light amount ratio is kept constant. In other words, the light amount of the finder LCD 36 is adjusted in real time according to the change in transmittance of the variable ND filter 40 such that the light amount ratio becomes constant.

Thereby, even in a case where the transmittance of the variable ND filter 40 is switched, the visibility of the display in the finder can be maintained satisfactorily.

Note that, as described above, the measurement of the transmittance of the variable ND filter 40 is performed intermittently. The finder LCD display control unit 110b intermittently controls the light amount of the finder LCD 36 on the basis of the information of the result of measurement of transmittance obtained intermittently.

In addition, the finder LCD display control unit 110b controls the driving of the backlight provided in the finder LCD 36, thereby controlling the light amount of the finder LCD 36.

[Operation of Digital Camera]

The digital camera 1 has a function of capturing an image and a function of reproducing an image. The function of capturing an image is activated by setting the mode of the digital camera 1 to an imaging mode. On the other hand, the function of reproducing an image is activated by setting the mode of the digital camera 1 to the reproduction mode. In a case where the power is turned on, the digital camera 1 is activated in an imaging mode. In a case where the reproduction button 18 is pressed in the state of the imaging mode, the digital camera 1 is switched to the reproduction mode. Further, in a case where the shutter button 12 is pressed in the reproduction mode, the digital camera 1 performs switching to the imaging mode.

<<Imaging Mode>>

The digital camera 1, which is set to the imaging mode, performs imaging processing in accordance with an operation of the shutter button 12. Specifically, each processing of AE and AF is performed in accordance with the half-pressing operation of the shutter button 12. Further, in response to a full-pressing operation of the shutter button 12, an image for recording is performed, and the obtained image is recorded on the memory card 68.

At the time of imaging, the user checks the imaging range and the like by using the viewfinder 30 or the rear monitor 4. Whether to use the viewfinder 30 or the rear monitor 4 depends on the setting of the view mode. The view mode is switched by the view mode button 17.

In a case where the rear monitor 4 is selected as the view mode, a live view is displayed on the rear monitor 4. That is, an image captured by the image sensor 52 through the imaging lens 3 is displayed on the rear monitor 4 in real time. The user views the display on the rear monitor 4 and checks the imaging range, the focus state, and the like.

On the other hand, in a case where the viewfinder 30 is selected as the view mode, the user checks the imaging range and the like by using the viewfinder 30.

Here, the viewfinder 30 can function as an OVF or an EVF. Whether the viewfinder 30 functions as an OVF or an EVF depends on the setting of the viewfinder 30. The setting of the viewfinder 30 is switched by the finder switching lever 15.

In a case where EVF is selected, a live view is displayed on the viewfinder 30 (refer to FIG. 5(B)). In such a case, the finder shutter 42 is closed, and the live view is displayed on the finder LCD 36. Thereby, the viewfinder 30 functions as an EVF. The user checks the imaging range, focus state, and the like by using the viewfinder 30 that functions as an EVF.

On the other hand, in a case where OVF is selected, the finder shutter 42 is opened. Thus, an optical image of the subject is observed from the finder eyepiece unit 30b through the observation optical system 32. In a case where OVF is selected, a visual field frame or the like is displayed on the finder LCD 36. Thus, the visual field frame and the like displayed on the finder LCD 36 are observed while being superimposed on the optical image of the subject obtained through the observation optical system 32.

In a case where the OVF is selected, the light amount of the finder LCD 36 is controlled on the basis of the result of photometry (subject luminance) of the photometry unit 64 in order to improve the visibility of the display in the finder. That is, the light amount is controlled to the light amount according to the result of photometry (refer to FIG. 11).

Further, the transmittance of the variable ND filter 40 is switched on the basis of the result of photometry performed by the photometry unit 64. The transmittance of the variable ND filter 40 is set as the first transmittance $\tau 1$ in a case where the result of photometry performed by the photometry unit 64 is less than the threshold value BT, and is set as the second transmittance $\tau 2$ in a case where the result of photometry is equal to or greater than the threshold value BT.

In a case where the transmittance of the variable ND filter 40 is switched, the light amount of the finder LCD 36 is controlled in conjunction with the switching. The light amount of the finder LCD 36 is controlled in real time in accordance with the change in transmittance of the variable ND filter 40.

Figure 13:
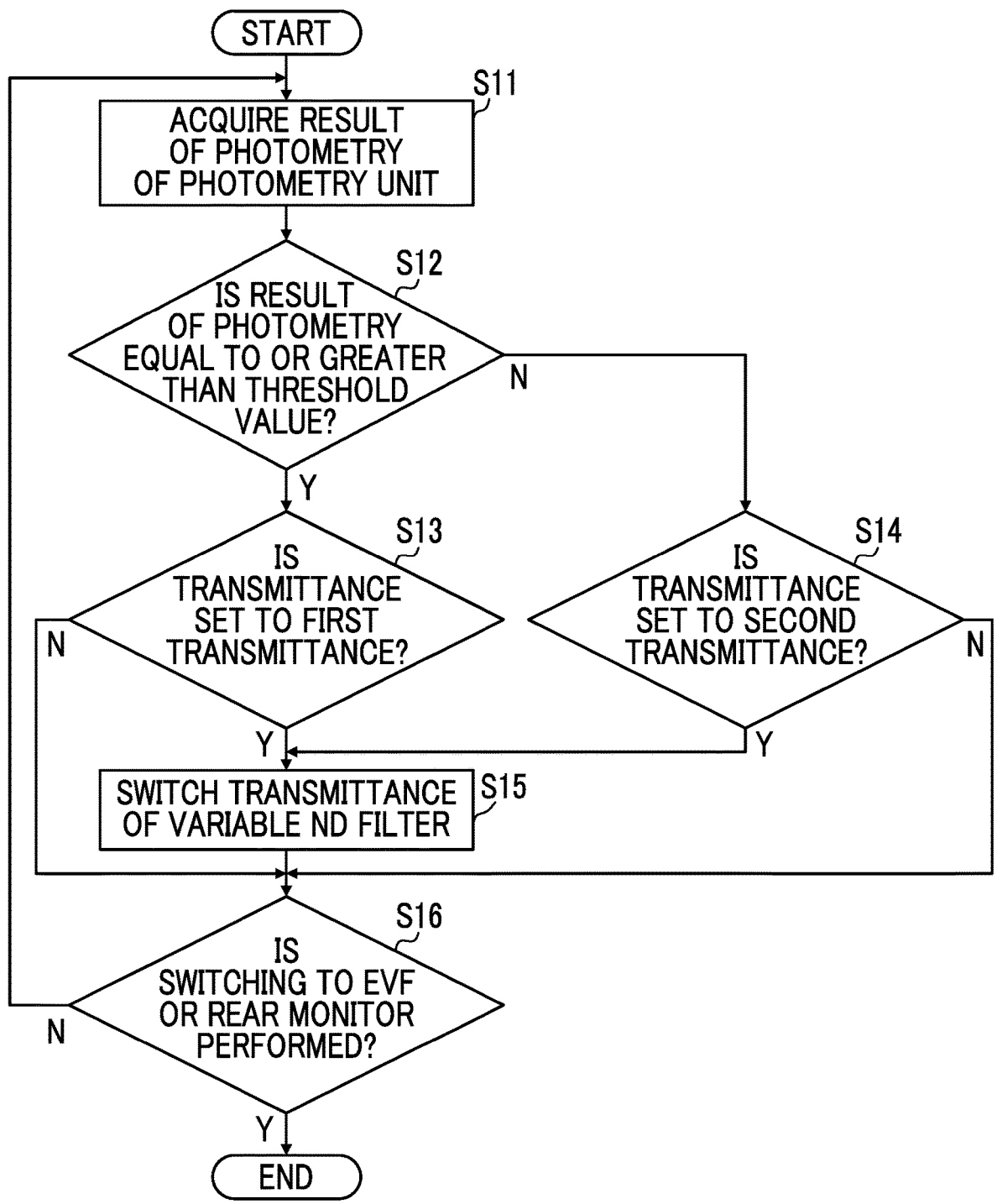
FIG. 13 is a flowchart showing a procedure for switching the transmittance of the variable ND filter.

FIG. 13 is a flowchart showing a procedure for switching the transmittance of the variable ND filter.

First, information about the result of photometry (subject luminance) performed by the photometry unit 64 is acquired (step S11). Next, it is determined whether or not the acquired result of photometry is equal to or greater than the threshold value BT (step S12).

In a case where the result is equal to or greater than the threshold value BT (YES in step S12), it is determined whether or not the current setting of the transmittance of the variable ND filter 40 is the first transmittance (step S13). In a case where the current setting of the transmittance of the variable ND filter 40 is the first transmittance, the transmittance of the variable ND filter 40 is switched (step S15). In such a case, the first transmittance is switched to the second transmittance. That is, since the environment is bright, the transmittance can be switched to a lower transmittance (=higher density).

On the other hand, in a case where the result of measurement is less than the threshold value BT (NO in step S12), it is determined whether or not the current transmittance setting of the variable ND filter 40 is the second transmittance (step S14). In a case where the current setting of the transmittance of the variable ND filter 40 is the second transmittance, the transmittance of the variable ND filter 40 is switched (step S15). In such a case, the second transmittance is switched to the first transmittance. That is, the transmittance is switched to a higher transmittance (=lower density).

Thereafter, it is determined whether or not the mode is switched to the EVF through selection of the viewfinder 30 is selected and whether or not the mode is switched to the rear monitor 4 through selection of the view mode (step S16). In a case where the mode is switched to the EVF or the rear monitor 4, the processing ends. In a case where the mode is not switched to the EVF or the rear monitor 4, the processing returns to step S11, and the above processing is repeatedly executed.

Figure 14:
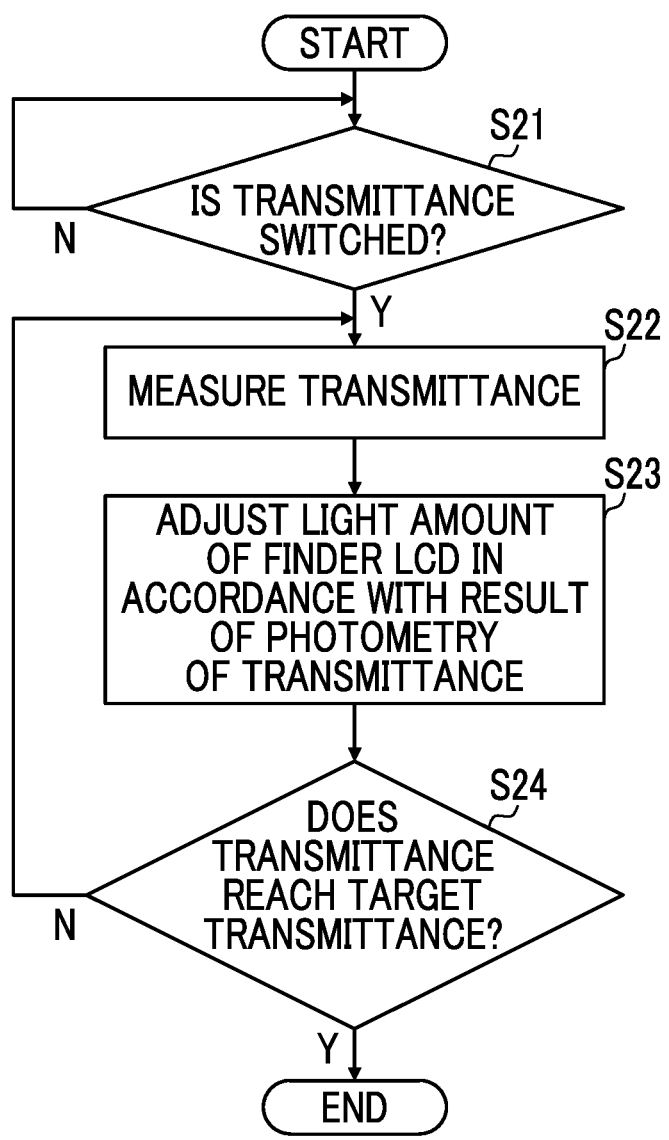
FIG. 14 is a flowchart showing a procedure of light amount control of a finder LCD in conjunction with switching of the transmittance of the variable ND filter.

FIG. 14 is a flowchart showing a procedure of light amount control of the finder LCD in conjunction with switching of the transmittance of the variable ND filter. This procedure is an example of a finder display control method.

First, it is determined whether or not the transmittance of the variable ND filter 40 is switched (step S21).

In a case where the transmittance of the variable ND filter 40 is switched, the transmittance of the variable ND filter 40 that changes over time is measured by the transmittance measurement unit 90 (step S22). The measurement is performed intermittently.

Each time the transmittance of the variable ND filter 40 is measured, the light amount of the finder LCD 36 is controlled by the finder LCD display control unit 110*b* (step S23). The finder LCD display control unit 110*b* controls the light amount of the finder LCD 36 as follows. That is, the transmittance measurement unit 90 controls the light amount ratio of the optical image of the subject observed through the observation optical system 32 and the display of the finder LCD 36 superimposed on the optical image so as to constantly keep the light amount ratio constant. The light amount of the finder LCD 36 is adjusted in accordance with the measured transmittance.

In a case where the light amount is adjusted, it is determined whether or not the transmittance of the variable ND filter 40 reaches the target transmittance on the basis of the result of measurement of transmittance (step S24). In a case where the transmittance of the variable ND filter 40 reaches the target transmittance, the processing ends.

On the other hand, in a case where it is determined that the transmittance of the variable ND filter 40 does not reach the target transmittance, the processing returns to step S22, and the transmittance is measured again. Then, the light amount of the finder LCD 36 is controlled on the basis of the result of measurement.

As described above, in a case where the transmittance of the variable ND filter 40 is switched, the change in transmittance is measured in real time, and the light amount of the finder LCD 36 is controlled in real time on the basis of the result of measurement. Thus, even in a case where the transmittance of the variable ND filter 40 is switched, the light amount of the optical image of the subject observed through the observation optical system 32 and the display of the finder LCD 36 superimposed on the optical image is constantly kept constant. Thereby, the visibility of the display in the finder can be maintained satisfactorily.

As described above, according to the digital camera 1 of the present embodiment, in a case where the viewfinder 30 is used as an OVF, the light amount of the finder LCD 36 and the transmittance of the variable ND filter 40 are controlled in accordance with the brightness of the subject. Thereby, favorable visibility can constantly be ensured in a range from a bright environment to a dark environment.

In a case where the transmittance of the variable ND filter 40 is switched, the light amount of the finder LCD 36 is adjusted in accordance with the change in transmittance. Thereby, even in a case where the transmittance of the variable ND filter 40 is switched, the visibility of the display in the finder can be maintained satisfactorily.

<<Reproduction Mode>>

By setting the digital camera 1 to the reproduction mode, the image recorded on the memory card 68 can be reproduced.

In a case where the reproduction mode is set, the last recorded image is read from the memory card 68 and displayed on the rear monitor 4. The displayed image is advanced frame by frame, enlarged, reduced, or the like in accordance with the operation of the operation unit 76.

[Modification Example]

<<Modification Example of Transmittance Measurement Unit>>

<Modification Example of Transmittance Measurement Using Light Emitting Unit and Light Receiving Unit>

Figure 15:
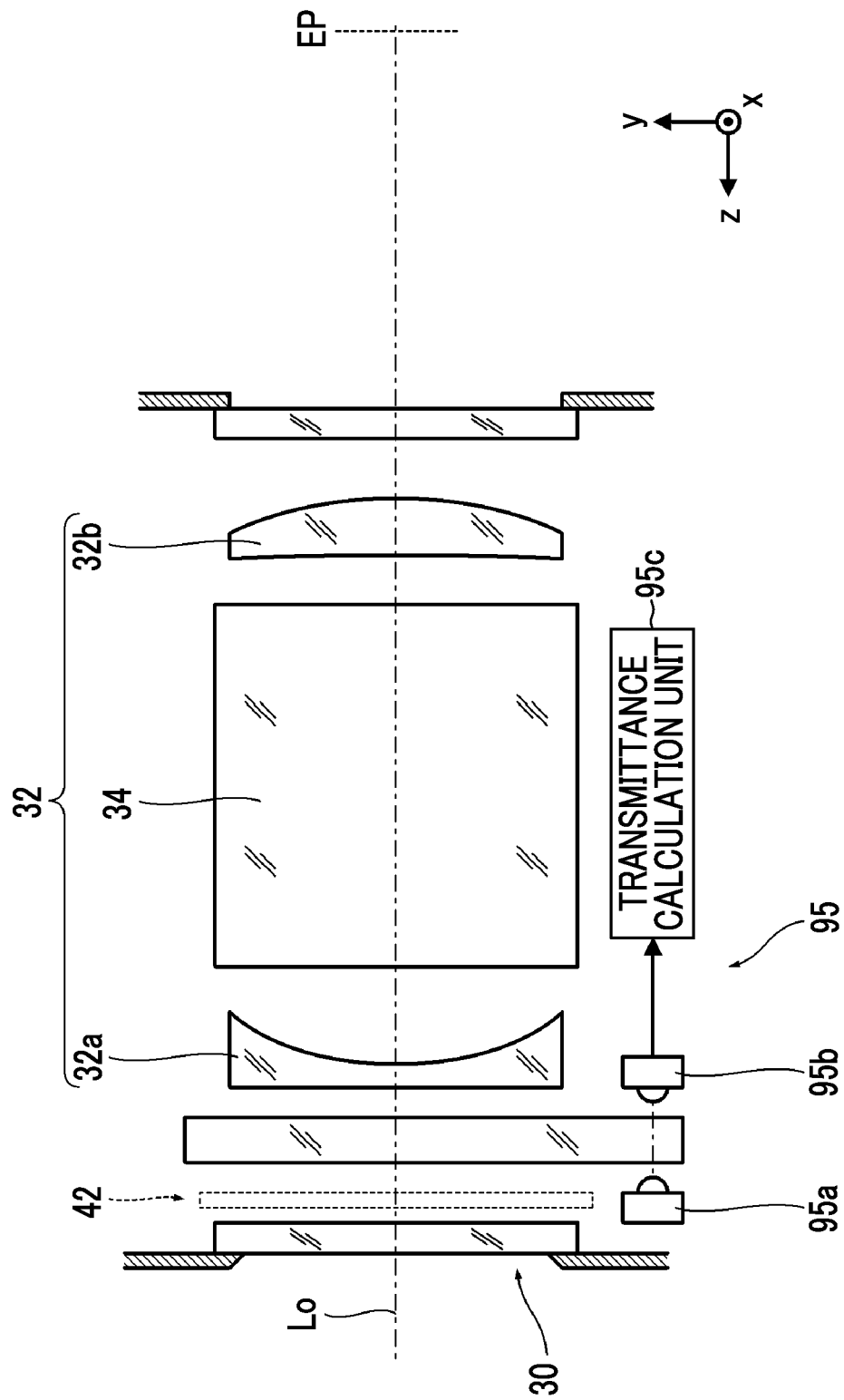
FIG. 15 is a diagram showing another example of the transmittance measurement unit in a case of measuring the transmittance of the variable ND filter by using the light emitting unit and the light receiving unit.

FIG. 15 is a diagram showing another example of the transmittance measurement unit in a case of measuring the transmittance of the variable ND filter by using the light emitting unit and the light receiving unit.

As shown in the drawing, the transmittance measurement unit 95 of the present example comprises a light emitting unit 95*a*, a light receiving unit 95*b*, and a transmittance calculation unit 95*c*.

The light emitting unit 95*a* and the light receiving unit 95*b* are disposed to face each other with the variable ND filter 40 interposed therebetween. The light emitting unit 95*a* emits light with a prescribed light amount toward the light receiving unit 95*b*. The light emitted from the light emitting unit 95*a* is transmitted through the variable ND filter 40 and is received by the light receiving unit 95*b*. The light receiving unit 95*b* measures the received light amount. The transmittance calculation unit 95*c* acquires information about the received light amount from the light receiving unit 95*b*, and calculates the transmittance of the variable ND filter 40.

As described above, in a case of measuring the transmittance of the variable ND filter 40 by using the light emitting unit and the light receiving unit, the light emitting unit and the light receiving unit may be disposed with the variable ND filter 40 interposed therebetween.

It should be noted that the configuration can be made compact by using a reflective member as in the above-mentioned embodiment. In the above-mentioned embodiment, a mirror is used as a reflective member, but the type of the reflective member is not particularly limited. For example, in the case of a configuration in which the transmittance is measured using infrared rays, the material itself of the holding unit of the variable ND filter can be used as a reflective member.

In addition, in a case of measuring the transmittance by using the light emitting unit and the light receiving unit, it is preferable to periodically perform calibration. The calibration is performed, for example, by setting the variable ND filter in a non-transmissive state and a total transmissive state and performing measurement. The calibration is performed, for example, while the power of the digital camera 1 is turned off.

<Measurement of Transmittance Using Table or Function>

A configuration may also be adopted in which the operating characteristics of the variable ND filter are acquired in advance, and the transmittance of the variable ND filter is specified on the basis of the acquired operating characteristics.

Specifically, information about change in transmittance over time from the start of switching to the switching to the target transmittance is acquired in advance, and the transmittance is estimated in real time on the basis of the information. In such a case, the transmittance is estimated on the basis of the elapsed time from the start of the switching.

It should be noted that the operating characteristics of the variable ND filter change depending on the temperature of the use environment. Therefore, the above information is acquired for each temperature.

Figure 16:
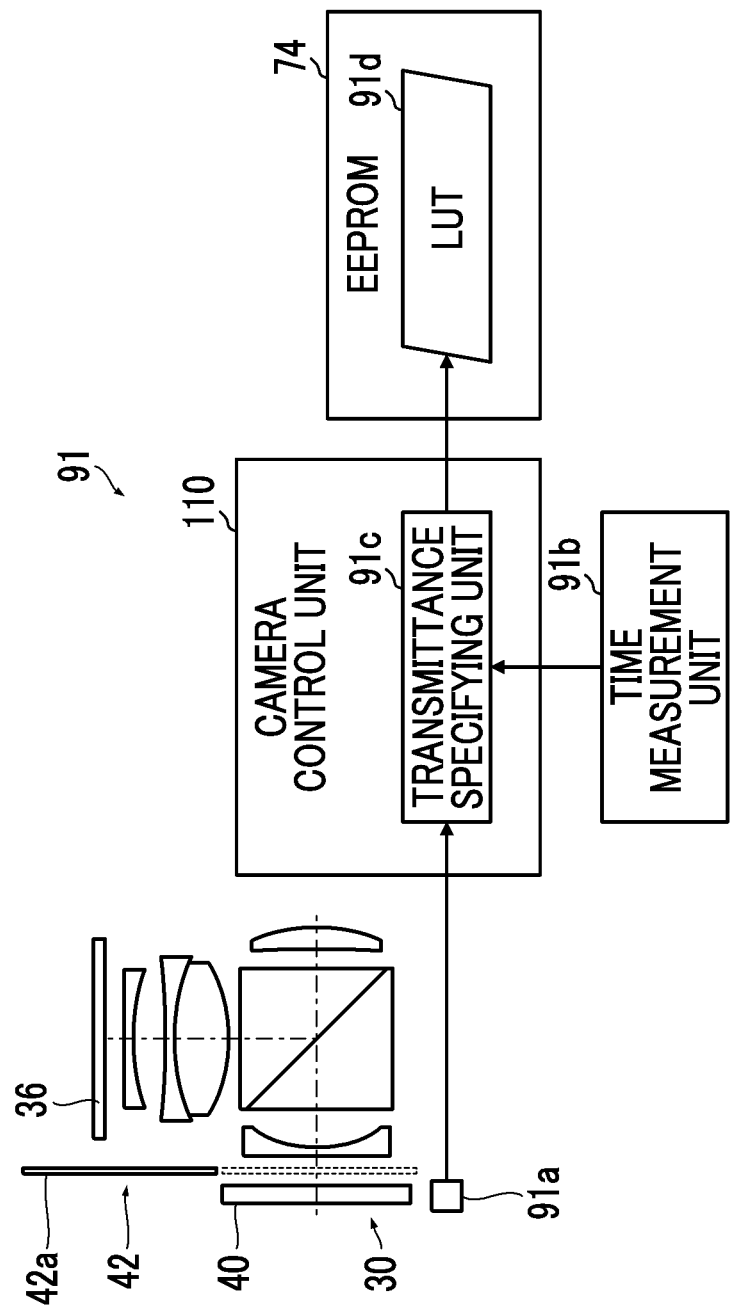
FIG. 16 is a diagram showing an example of a transmittance measurement unit in a case of measuring the transmittance of the variable ND filter using a table.

FIG. 16 is a diagram showing an example of the transmittance measurement unit in a case of measuring the transmittance of the variable ND filter using a table.

As shown in the drawing, the transmittance measurement unit 91 of the present example comprises a temperature sensor 91a, a time measurement unit 91b, a transmittance specifying unit 91c, and a lookup table (LUT) 91d.

The temperature sensor 91a is disposed near the variable ND filter 40 and measures the temperature around the variable ND filter 40. The temperature sensor 91a is an example of a temperature measurement unit.

In a case where the transmittance of the variable ND filter 40 is switched, the time measurement unit 91b measures the elapsed time from the start of the switching.

The transmittance specifying unit 91c acquires information about the temperature measured by the temperature sensor 91a and information about the elapsed time measured by the time measurement unit 91b, and specifies the transmittance of the variable ND filter 40 with reference to the lookup table 91d. The function of the transmittance specifying unit 91c is realized by the camera control unit 100. That is, the camera control unit 100 functions as the transmittance specifying unit 91c by executing a predetermined program.

The lookup table 91d is stored in the EEPROM 74. The lookup table 91d stores transmittance information in association with the temperature and the elapsed time. Therefore, in a case where the temperature and the elapsed time are specified, the transmittance is specified from the lookup table 91d.

In a case where the transmittance of the variable ND filter 40 is switched in the transmittance measurement unit 91 configured as described above, the transmittance specifying unit 91c acquires temperature information from the temperature sensor 91a. Further, information about the elapsed time from the start of the switching is acquired from the time measurement unit 91b. The transmittance specifying unit 91c specifies the transmittance of the variable ND filter 40 in real time with reference to the lookup table on the basis of the acquired information about the temperature and the elapsed time.

As described above, the transmittance of the variable ND filter 40 can also be obtained by using the information about the operating characteristics obtained in advance.

In this example, the configuration is such that the transmittance is obtained using a table. However, the configuration may be made such that the transmittance is obtained using a function. That is, in the configuration, a function that determines the operating characteristics of the variable ND filter 40 is obtained in advance, and the transmittance is obtained using the function. The function is defined using temperature and elapsed time as parameters.

Further, in this example, the temperature sensor 91a is disposed near the variable ND filter 40, but the arrangement position of the temperature sensor 91a is not limited to this. However, it is preferable that the temperature sensor 91a is disposed as close to the variable ND filter 40 as possible. Thereby, the transmittance can be detected with high accuracy.

In the above-mentioned embodiment, the measurement of the transmittance is performed intermittently, but may be performed continuously.

Further, in the above-mentioned embodiment, the measurement is finished in a case where the target transmittance is reached, but the measurement may be continued even after the target transmittance is reached. In such a case, the measurement interval may be increased. That is, in a case where the target transmittance is reached, the interval time is increased and measurement is continued.

<<Modification Example of Variable ND Filter>>

In the above-mentioned embodiment, an ND filter composed of an electrochromic element is used as the electronic variable ND filter, but the electronic variable ND filter applicable to the present invention is not limited to this. Any ND filter having a configuration capable of electronically controlling the transmittance (density) may be used. Therefore, for example, an ND filter composed of liquid crystal can be used.

Further, in the above-mentioned embodiment, the transmittance of the variable ND filter 40 is switched in two stages, but may be switched in a smaller number of stages. For example, a configuration in which switching is performed in three stages may be adopted.

In the above-mentioned embodiment, the variable ND filter 40 is disposed in the finder window unit 30a, but the arrangement position of the variable ND filter 40 is not limited to this. The variable ND filter 40 may be disposed in the optical path from the finder window unit part 30a to the beam splitter 34.

<<Modification Example of Display Device>>

In the above-mentioned embodiment, the LCD is used as the display device, but the display device applicable to the present invention is not limited to this. In addition, for example, display devices such as an organic electroluminescence display (Organic Light Emitting Diode Display, OLED Display), a fluorescent display tube (VFD: Vacuum Fluorescent Display), and a plasma display panel (PDP), particularly, flat panel display devices can be used.

The display device light amount control unit controls the display light amount of the display device in accordance with the display device to be used. For example, in a case where an organic electroluminescence display is used as a display device, the light amount emitted from each pixel is controlled, thereby controlling the amount of display of the display device superimposed on an optical image.

<<Modification Example of Photometry Unit>>

In the above-mentioned embodiment, the configuration is such that the external light is measured on the basis of the image signal which is output from the image sensor 52, but the configuration of the photometry unit that measures the external light is not limited to this.

Figure 17:
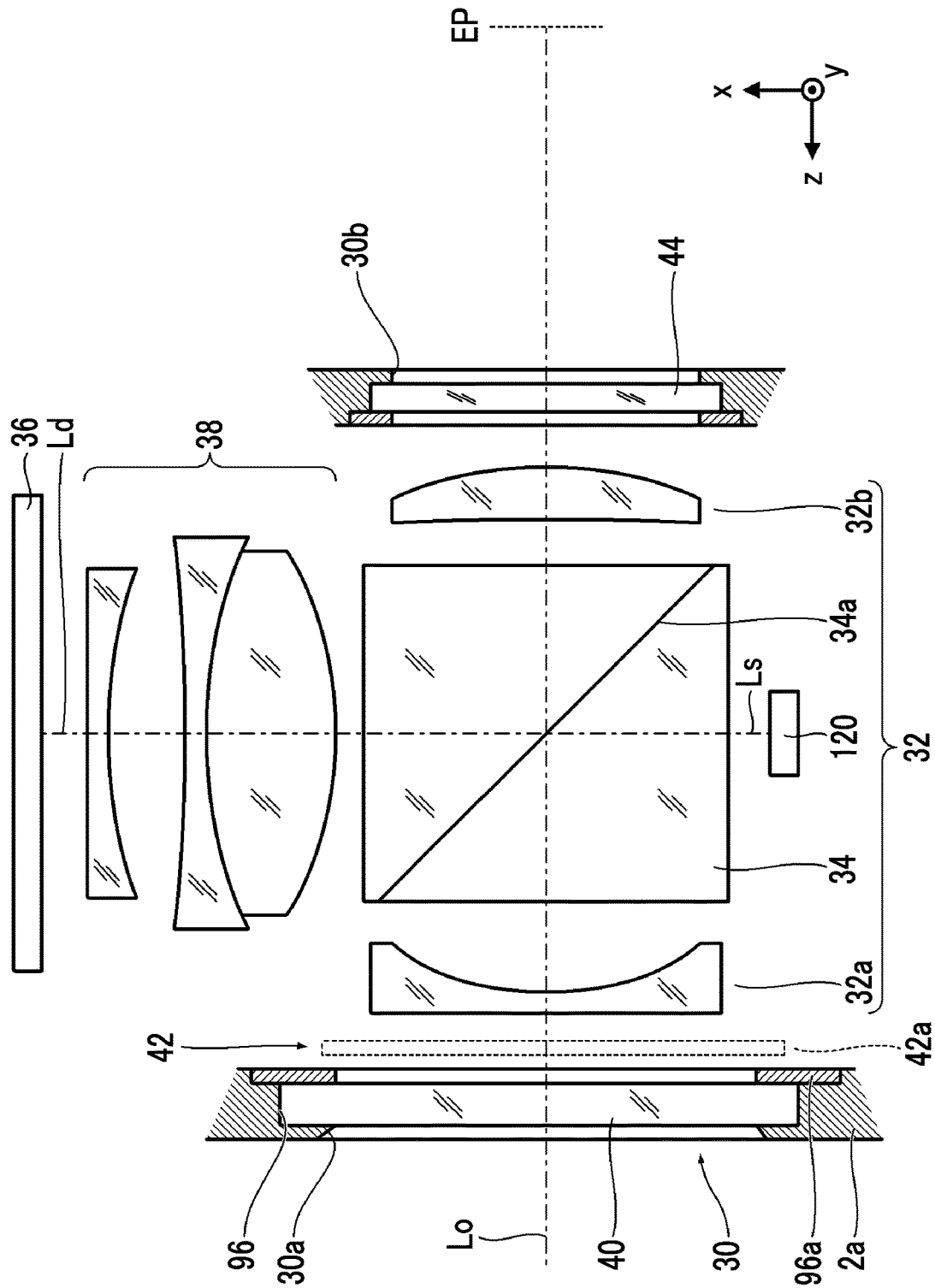
FIG. 17 is a schematic configuration diagram showing another example of the photometry unit.

FIG. 17 is a schematic configuration diagram showing another example of the photometry unit.

As shown in the drawing, the photometry unit of this example is composed of an illuminance sensor 120. The illuminance sensor 120 is disposed on an optical axis Ls orthogonal to the optical axis Lo of the observation optical system 32 and passing through the semi-transparent film 34a of the beam splitter 34. A part of the external light incident from the finder window unit 30a and a part of the light from the finder LCD 36 are incident into the illuminance sensor 120. The external light incident from the finder window unit 30a is transmitted through the variable ND filter 40 and the objective lens 32a, and is incident into the beam splitter 34. A part of the external light incident into the beam splitter 34 is reflected by the semi-transparent film 34a and is incident into the illuminance sensor 120. The light from the finder LCD 36 is incident into the beam splitter 34, and a part of the light is transmitted through the semi-transparent film 34a and is incident into the illuminance sensor 120. The illuminance sensor 120 detects the illuminance inside the viewfinder 30 on the basis of the light amount of the light incident into the light receiving unit. The variable ND filter transmittance switching control unit switches the transmittance of the variable ND filter 40 on the basis of the result of detection of the illuminance sensor 120.

In this example, the illuminance sensor 120 detects the illuminance in the finder. However, for example, the illuminance sensor may be disposed in front surface of the camera body to detect the illuminance of external light. In such a case, it is preferable that the illuminance sensor 120 is provided near the finder window unit 30a.

<<Modification Example of Superimposing Optical Element>>

In the above-mentioned embodiment, the prism type beam splitter 34 is used as the superimposing optical element, but the superimposing optical element applicable to the present invention is not limited to this. In addition, for example, a half mirror or the like can be used as a superimposing optical element.

<<Application to Camera Equipped with Reflex Finder>>

The present invention can be applied to a camera having a reflex finder. For example, the present invention can be applied to a single-lens reflex camera.

Figure 18:
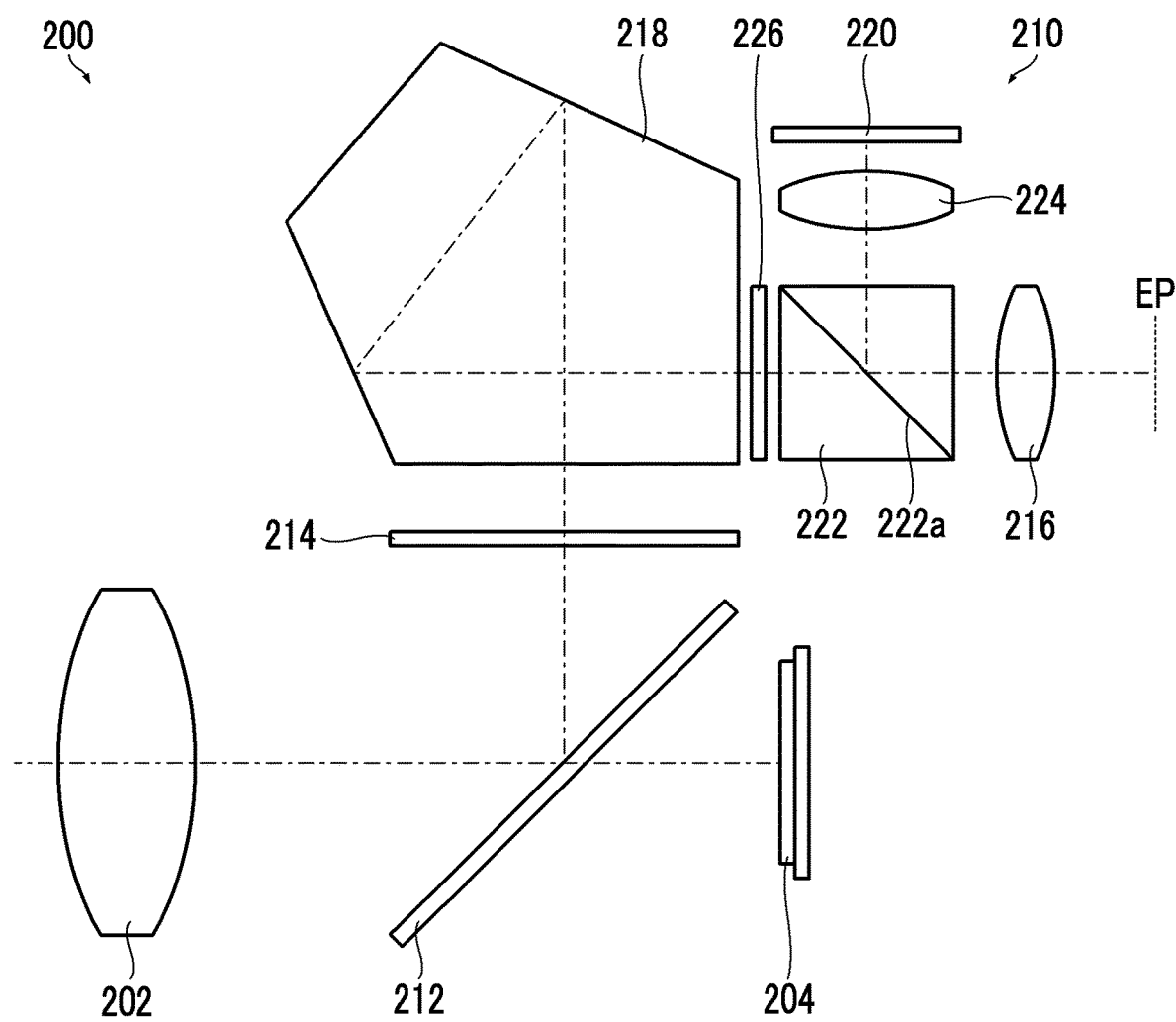
FIG. 18 is a schematic configuration diagram showing an example of a single-lens reflex camera according to the present invention.

FIG. 18 is a schematic configuration diagram showing an example of a single-lens reflex camera according to the present invention.

The single-lens reflex camera 200 comprises a reflex finder 210 as its optical finder.

As shown in FIG. 18, the light passing through the imaging lens 202 is reflected by a reflection mirror 212 and forms an image on a focusing screen 214 placed on an image forming surface equivalent to the image forming surface of the image sensor 204. The user observes the optical image of the subject formed on the focusing screen 214 through the eyepiece lens 216 and the pentagonal roof prism 218.

The single-lens reflex camera 200 of this example further comprises a finder LCD 220, and a beam splitter 222 and a target lens 224 for superimposing display of the finder LCD 220 on an image observed from the eyepiece lens 216.

The beam splitter 222 is an example of a superimposing optical element. The beam splitter 222 has a semi-transparent film 222a on the inner slope. The beam splitter 222 is disposed between the pentagonal roof prism 218 and the eyepiece lens 216.

The finder LCD 220 is an example of a display device. The finder LCD 220 is disposed on an optical axis orthogonal to the optical axis of eyepiece lens 216.

The target lens 224 is disposed in an optical path between the finder LCD 220 and the beam splitter 222, and guides light from the finder LCD 220 to the eyepiece lens 216.

In a case where an image is displayed on the finder LCD 220, the light from the finder LCD 220 is incident into the beam splitter 222 through the target lens 224. The light incident into the beam splitter 222 is reflected by the semi-transparent film 222a and is incident on the eye point EP through the eyepiece lens 216.

Thereby, the display on the finder LCD 220 is observed in a state where the display is superimposed on the image on the focusing screen.

In the single-lens reflex camera 200 of this example, a variable ND filter 226 is further disposed between the pentagonal roof prism 218 and the beam splitter 222. The variable ND filter 226 is an example of an electronic variable ND filter, and is composed of an ND filter that is able to electronically control the transmittance. The variable ND filter 226 adjusts the light amount of light incident into the beam splitter 222 from the pentagonal roof prism 218 by changing the transmittance (density) thereof. The transmittance of the variable ND filter 226 is measured by a transmittance measurement unit (not shown).

As in the digital camera 1 of the above-mentioned embodiment, the transmittance of the variable ND filter 226 is switched on the basis of the result of photometry of the external light.

In a case where the transmittance of the variable ND filter 226 is switched, the transmittance is measured in real time by the transmittance measurement unit. Then, on the basis of the result of measurement, the light amount of the finder LCD 220 is controlled in real time.

As described above, the present invention can be applied to a camera having a reflex finder.

<<Modification Example of Viewfinder>>

In the above-mentioned embodiment, the configuration is made such that the viewfinder can be used also as an EVF, but the function as an EVF may be removed. In such a case, the finder shutter can be removed.

Further, in the above-mentioned embodiment, the finder shutter is composed of a so-called mechanical shutter, but a liquid crystal shutter or the like may be used.

Further, in the above-mentioned embodiment, the observation optical system 32 is composed of the observation optical system of the reverse Galileo finder, but the configuration of the observation optical system of the viewfinder is not limited to this. The imaging lens may be composed of an independent optical system.

<<Modification Example of Imaging Apparatus>>

In the above-mentioned embodiment, the case where the present invention is applied to a digital camera with an integrated lens has been described as an example, but the application of the present invention is not limited to this. The present invention can be similarly applied to an interchangeable-lens-type digital camera.

<<Other Modification Examples>>

In the above-mentioned embodiment, the camera control unit 100 is composed of a microcomputer, but the hardware configuration for realizing these functions is not limited to this. The camera control unit 100 can be composed of various processors. Various processors includes a CPU as a general-purpose processor which functions as a processing unit executing various kinds of processing by executing software (programs); a programmable logic device (PLD) as a processor capable of changing a circuit configuration after manufacturing a field programmable gate array (FPGA); and a dedicated electrical circuit as a processor, which has a circuit configuration specifically designed to execute specific processing, such as an application specific integrated circuit (ASIC).

One processing unit may be composed of one of these various processors, or may be composed of two or more processors of the same type or different types. For example, one processing unit may be composed of a plurality of FPGAs or a combination of a CPU and an FPGA.

Further, the plurality of processing units may be composed of one processor. As an example of the plurality of processing units composed of one processor, first, as represented by a computer such as a client or server, there is a form in which one processor is composed of a combination of one or more CPUs and software and this processor functions as a plurality of processing units. Second, as represented by a system on chip (SoC), there is a form in which a processor that realizes the functions of the whole system including a plurality of processing units with a single integrated circuit (IC) chip is used. As described above, the various processing units are configured by using one or more of the various processors as a hardware structure.

Furthermore, the hardware structure of these various processors is more specifically an electric circuit in which circuit elements such as semiconductor elements are combined.

EXPLANATION OF REFERENCES

1: digital camera
2: camera body
2a: exterior body
3: imaging lens
3f: focus lens
3i: stop
4: rear monitor
11: power lever
12: shutter button
13: exposure compensation dial
14: shutter speed dial
15: finder switching lever
16: command dial
17: view mode button
18: reproduction button
19: erase button
20: function button
21: AE/AF lock button
22: selector button
23: OK button
24: menu button
25: DISP/BACK button
30: viewfinder
30a: finder window unit
30b: finder eyepiece unit
32: observation optical system
32a: objective lens
32b: eyepiece lens
34: beam splitter
34a: semi-transparent film
36: finder LCD
38: target lens
40: variable ND filter
42: finder shutter
42a: finder shutter base plate
42b: finder shutter driving unit
44: cover glass
50: lens driving unit
50f: focus lens driving unit
50i: stop driving unit
52: image sensor
54: image sensor driving unit
56: analog signal processing unit
58: analog-to-digital converter
60: digital signal processing unit
62: AF detection unit
64: photometry unit
66: memory card interface unit
68: memory card
70: rear monitor driver
72: communication interface unit
74: EEPROM
76: operation unit
78: sensor unit
78a: triaxial acceleration sensor
78b: triaxial angular velocity sensor
78c: triaxial geomagnetic sensor
82: finder LCD driver
84: variable ND filter driver
90: transmittance measurement unit
91: transmittance measurement unit
91a: temperature sensor
91b: time measurement unit
91c: transmittance specifying unit
91d: lookup table
92: reflective member
94: transmittance measurement unit
94a: light emitting unit
94b: light receiving unit
94c: transmittance calculation unit
95: transmittance measurement unit
95a: light emitting unit
95b: light receiving unit
95c: transmittance calculation unit
96: holding unit
96a: stopper plate
96b: reflective member attachment unit
98: transmittance measurement unit attachment unit
100: camera control unit
100a: AF control unit
100b: AE control unit
100c: recording control unit
100d: communication control unit
100e: rear monitor display control unit
110: viewfinder control unit
110a: finder shutter control unit
110b: finder LCD display control unit
110c: transmittance measurement control unit
110d: variable ND filter transmittance switching control unit
120: illuminance sensor
200: single-lens reflex camera
202: imaging lens
204: image sensor
210: reflex finder
212: reflection mirror
214: focusing screen
216: eyepiece lens
218: pentagonal roof prism
220 finder LCD
222: beam splitter
222a: semi-transparent film
224: target lens
226: variable ND filter
EP: eye point
F1: visual field frame
F2: AF frame
I1: imaging information
Ld: optical axis
Lo: optical axis of observation optical system
ls: optical axis
z: optical axis
τ1: first transmittance
τ2: second transmittance
s11 to s16: procedure for switching transmittance of variable ND filter
s21 and s22: procedure for light amount control of finder LCD in conjunction with switching of transmittance of variable ND filter

What is claimed is:

1. An imaging apparatus comprising:
an optical finder through which an optical image of a subject is observed;
a display;
a superimposing optical element that is disposed in an optical path of the optical finder so as to superimpose displaying by the display on the optical image of the subject observed through the optical finder;
an electronic variable ND filter that is disposed in an optical path of the optical finder so as to adjust a light amount of the optical image of the subject incident into the superimposing optical element;
a transmittance measurer that measures a transmittance of the electronic variable ND filter changing over time in a case where the transmittance of the electronic variable ND filter is switched; and
a processor configured to control a light amount of the display on the basis of a result of measurement of the transmittance measurer so as to keep constant a light amount ratio of the optical image of the subject observed through the optical finder and the displaying by the display superimposed on the optical image.

2. The imaging apparatus according to claim 1,
wherein the transmittance measurer includes a temperature sensor that measures temperature and a clock that measures an elapsed time since the transmittance of the electronic variable ND filter is switched, and specifies the transmittance of the electronic variable ND filter, on the basis of information about the temperature measured by the temperature sensor and information about the elapsed time measured by the clock.

3. The imaging apparatus according to claim 1,
wherein the transmittance measurer includes a light emitter and a light receptor that are disposed to face each other with the electronic variable ND filter interposed therebetween, and measures the transmittance of the electronic variable ND filter by receiving light, which is emitted from the light emitter, through the light receptor.

4. The imaging apparatus according to claim 1,
wherein the transmittance measurer includes a reflector, and a light emitter and a light receptor that are disposed to face the reflector with the electronic variable ND filter interposed therebetween, and measures the transmittance of the electronic variable ND filter by receiving light, which is emitted from the light emitter and reflected by the reflector, through the light receptor.

5. The imaging apparatus according to claim 4,
wherein the reflector is provided on the electronic variable ND filter in a holder.

6. The imaging apparatus according to claim 1,
wherein the optical finder is composed of an optical system, which is independent of an imaging lens, to observe an optical image of a subject incident through a finder window from an eyepiece.

7. The imaging apparatus according to claim 6,
wherein the electronic variable ND filter is provided in the finder window.

8. The imaging apparatus according to claim 1,
wherein the electronic variable ND filter is composed of an electrochromic element.

9. The imaging apparatus according to claim 1, further comprising
an illuminance sensor that measures external light,
wherein the processor switches the transmittance of the electronic variable ND filter on the basis of a result of photometry of the illuminance sensor.

10. A finder display control method of an imaging apparatus including an optical finder through which an optical image of a subject is observed, a display, a superimposing optical element that is disposed in an optical path of the optical finder so as to superimpose displaying by the display on the optical image of the subject observed through the optical finder, and an electronic variable ND filter that is disposed in an optical path of the optical finder so as to adjust a light amount of the optical image of the subject incident into the superimposing optical element, the method comprising:
a step of measuring a transmittance of the electronic variable ND filter changing over time in a case where the transmittance of the electronic variable ND filter is switched; and
a step of controlling the light amount of the display on the basis of a result of measurement of the transmittance so as to keep constant a light amount ratio of the optical image of the subject observed through the optical finder and the displaying by the display superimposed on the optical image.

11. A non-transitory and computer-readable recording medium, the recording medium for causing a computer to execute, in a case where instructions stored in the recording medium are read by the computer,
a finder display control function of an imaging apparatus including an optical finder through which an optical image of a subject is observed, a display, a superimposing optical element that is disposed in an optical path of the optical finder so as to superimpose displaying by the display on the optical image of the subject observed through the optical finder, and an electronic variable ND filter that is disposed in an optical path of the optical finder so as to adjust a light amount of the optical image of the subject incident into the superimposing optical element, the function including:
a function of acquiring information about a result of measurement of a transmittance of the electronic variable ND filter changing over time in a case where the transmittance of the electronic variable ND filter is switched; and
a function of controlling the light amount of the display on the basis of a result of measurement of the transmittance so as to keep constant a light amount ratio of the optical image of the subject observed through the optical finder and the displaying by the display superimposed on the optical image.

12. A viewfinder comprising:
an observation optical system through which an optical image of a subject incident through the finder window from the eyepiece is observed;
a display;
a superimposing optical element that is disposed in an optical path of the observation optical system so as to superimpose displaying by the display on the optical image of the subject observed through the observation optical system;
an electronic variable ND filter that is disposed in an optical path of the observation optical system so as to adjust a light amount of the optical image of the subject incident into the superimposing optical element;

a transmittance measurer that measures a transmittance of the electronic variable ND filter changing over time in a case where the transmittance of the electronic variable ND filter is switched; and a processor that controls a light amount of the display on the basis of a result of measurement of the transmittance measurer so as to keep constant a light amount ratio of the optical image of the subject observed through the observation optical system and the displaying by the display superimposed on the optical image.

* * * * *